(12) United States Patent
You

(10) Patent No.: US 11,082,164 B2
(45) Date of Patent: Aug. 3, 2021

(54) DATA TRANSMISSION METHOD, TERMINAL DEVICE, AND NETWORK DEVICE

(71) Applicant: HUAWEI TECHNOLOGIES CO., LTD., Guangdong (CN)

(72) Inventor: Chunhua You, Shanghai (CN)

(73) Assignee: Huawei Technologies Co., Ltd., Guangdong (CN)

(*) Notice: Subject to any disclaimer, the term of this patent is extended or adjusted under 35 U.S.C. 154(b) by 89 days.

(21) Appl. No.: 16/521,331

(22) Filed: Jul. 24, 2019

(65) Prior Publication Data

US 2019/0349145 A1 Nov. 14, 2019

Related U.S. Application Data

(63) Continuation of application No. PCT/CN2018/073123, filed on Jan. 18, 2018.

(30) Foreign Application Priority Data

Jan. 25, 2017 (CN) .................. 201710056686.X

(51) Int. Cl.
*H04L 1/18* (2006.01)
*H04W 76/28* (2018.01)
(Continued)

(52) U.S. Cl.
CPC .......... *H04L 1/1858* (2013.01); *H04L 1/1819* (2013.01); *H04W 16/14* (2013.01);
(Continued)

(58) Field of Classification Search
None
See application file for complete search history.

(56) References Cited

U.S. PATENT DOCUMENTS 10,420,147 B2 9/2019 Dinan
2009/0245194 A1 10/2009 Damnjanovic et al.
(Continued)

FOREIGN PATENT DOCUMENTS

CN 101978642 A 2/2011
CN 104333873 A 2/2015
(Continued)

OTHER PUBLICATIONS

LTE et al.,"HARQ timing and resource of PUCCH",3GPP TSG-RAN WG1 Meeting #87,Reno, USA, R1-1611290, Nov. 14-18, 2016, 4 pages.
(Continued)

*Primary Examiner* — Alex Skripnikov
(74) *Attorney, Agent, or Firm* — Fish & Richardson P.C.

(57) ABSTRACT

Embodiments of this application provide a data transmission method, a terminal device, and a network device. The method includes: receiving, by a terminal device, a first indication sent by a network device; receiving, by the terminal device, downlink data based on the first indication, and generating feedback information of the downlink data; receiving, by the terminal device, a second indication sent by the network device, where the second indication indicates a start location of an uplink time unit; determining, by the terminal device based on the first indication and the second indication, a resource location for sending the feedback information; and sending, by the terminal device, the feedback information at the resource location.

21 Claims, 10 Drawing Sheets

(51) Int. Cl.
*H04W 16/14* (2009.01)
*H04W 72/14* (2009.01)
*H04W 74/08* (2009.01)

(52) U.S. Cl.
CPC ....... *H04W 72/14* (2013.01); *H04W 74/0808* (2013.01); *H04W 76/28* (2018.02)

(56) References Cited

U.S. PATENT DOCUMENTS

| | | | |
|---|---|---|---|
| 2015/0049709 | A1 | 2/2015 | Damnjanovic et al. |
| 2016/0174259 | A1 | 6/2016 | Mukherjee et al. |
| 2017/0171759 | A1 | 6/2017 | Li et al. |
| 2018/0124749 | A1* | 5/2018 | Park ................... H04W 74/08 |
| 2020/0029385 | A1* | 1/2020 | Bergstrom ........ H04W 72/1289 |

FOREIGN PATENT DOCUMENTS

| | | |
|---|---|---|
| CN | 105306180 A | 2/2016 |
| CN | 106162909 A | 11/2016 |
| WO | 2011074839 A2 | 6/2011 |

OTHER PUBLICATIONS

Huawei et al.,"Advanced multi-user detectors for grant-free transmissions",3GPP TSG RAN WG1 Meeting #86bis, Lisbon, Portugal, R1-1608855, Oct. 10-14, 2016, 8 pages.
PCT International Search Report and Written Opinion in International Application No. PCT/CN2018/073,123, dated Mar. 26, 2018, 13 pages (With English Translation).
Office Action issued in Chinese Application No. 201710056686.X dated Nov. 1, 2019, 9 pages (with English translation).
R1-160594—OPPO, "PUCCH transmission on eLAA carrier," 3GPP TSG RAN WG1 Meeting #84, St Julian's, Malta, Feb. 15-19, 2016, 3 pages.
R1-1608859—Huawei et al, "The retransmission and HARQ schemes for grant-free," 3GPP TSG RAN WG1 Meeting #86bis, Lisbon, Portugal, Oct. 10-14, 2016, 5 pages.
Search Report issued in Chinese Application No. 201710056686.X dated Oct. 17, 2019, 6 pages (with English translation).
Extended European Search Report issued in European Application No. 18744516.8 dated Dec. 11, 2019, 11 pages.
R2-160471—Ericsson, "Connected Mode DRX for NB-IoT," 3GPP Draft; 3GPP TSG-RAN WG2 Meeting NB-IOT ad-hoc, Budapest, Hungary, XP51054758, Jan. 19-21, 2016, 8 pages.

* cited by examiner

DATA TRANSMISSION METHOD, TERMINAL DEVICE, AND NETWORK DEVICE

CROSS-REFERENCE TO RELATED APPLICATIONS

This application is a continuation of International Application No. PCT/CN2018/073123, filed on Jan. 18, 2018, which claims priority to Chinese Patent Application No. 201710056686.X, filed on Jan. 25, 2017. The disclosures of the aforementioned applications are hereby incorporated by reference in their entireties.

TECHNICAL FIELD

Embodiments of this application relate to the communications field, and more specifically, to a data transmission method, a terminal device, and a network device.

BACKGROUND

During downlink scheduling in a long term evolution (LTE) system, a terminal device receives a physical downlink control channel (PDCCH) indication (assignment) sent by a network device. The assignment directly indicates a transmission resource (time-frequency resource) on which downlink data is located, and a modulation and coding scheme. Based on the assignment, the terminal device receives the downlink data in a current downlink subframe, attempts to decode the downlink data, generates a feedback result, that is, a downlink hybrid automatic repeat request (HARQ) feedback (feedback), and then sends the HARQ feedback on a PUCCH channel after four subframes.

Herein, before sending the HARQ feedback, the terminal device does not perform listen before talk (LBT) channel detection. This is not in compliance with a regulation, and a time-frequency resource location of the HARQ feedback cannot be flexibly determined. In view of this, a new solution is urgently needed.

SUMMARY

Embodiments of this application provide a data transmission method, a terminal device, and a network device, so as to flexibly determine a resource location for feedback information.

According to a first aspect, a data transmission method is provided, including:

receiving, by a terminal device, a first indication sent by a network device;

receiving, by the terminal device, downlink data based on the first indication, and generating feedback information of the downlink data;

receiving, by the terminal device, a second indication sent by the network device, where the second indication is used to indicate a start location of an uplink time unit;

determining, by the terminal device based on the first indication and the second indication, a resource location for sending the feedback information; and sending, by the terminal device, the feedback information at the resource location.

In this embodiment of this application, the terminal device may receive the first indication sent by the network device; receive the downlink data based on the first indication, and generate the feedback information of the downlink data; then receive the second indication sent by the network device, where the second indication is used to indicate the start location of the uplink time unit; determine, based on the first indication and the second indication, the (time-frequency) resource location for sending the feedback information; and finally, send the feedback information at the resource location. In this way, the resource location for the feedback information can be flexibly determined. Herein, the "resource location" may include a location of a time domain resource and/or a location of a frequency domain resource.

In this embodiment of this application, the first indication is used to indicate a resource, for example, a time domain resource and/or a frequency domain resource, used by the terminal device for receiving the downlink data from the network device.

In some possible implementations, the first indication may be used to indicate at least one of a valid time range for receiving the second indication, a relative time position of the feedback information, an LBT type (for example, 25 µs LBT, rollback-mechanism-based LBT, or another type), a time-frequency resource location of the downlink data, a modulation and coding scheme of the downlink data, a HARQ process used for the downlink data, whether the downlink data is newly transmitted or retransmitted, or a redundancy version used for the downlink data, or other information that may be used during data transmission. This is not limited.

Optionally, the first indication may be sent by the network device on a downlink physical channel.

Optionally, the second indication may further include duration information, that is, information about a time length for sending the feedback information.

In some possible implementations, the terminal device may determine a time-frequency resource location for the feedback information based on the relative time position of the feedback information indicated by the first indication and the start location of the uplink time unit indicated by the second indication.

Optionally, the feedback information may be sent on an uplink control channel or an uplink data channel.

In some possible implementations, the first indication may include the valid time range, where the first indication is used to instruct the terminal device to receive, within the valid time range, the second indication sent by the network device.

In some possible implementations, before the sending, by the terminal device, the feedback information at the resource location, the method further includes:

performing, by the terminal device, listen before talk LBT channel detection, and detecting that a channel is a clear channel.

In other words, before sending the feedback information, the terminal device may perform clear channel detection by using a first channel access solution (Channel Access Procedure) or first LBT (for example, 25 µs LBT), and detect that the channel is a clear channel. In this way, the terminal device needs to perform only 25 µs LBT instead of rollback-mechanism-based LBT (implementation of which is relatively time consuming), thereby reducing both a channel contention time and a data transmission delay.

In some possible implementations, the first indication and/or the second indication may further indicate a time domain range location for performing first LBT (for example, 25 µs LBT).

In some possible implementations, the method may further include:

when a discontinuous reception DRX mechanism is configured for the terminal device by the network device, if the second indication is received within the valid time range, stopping monitoring a downlink physical channel from a reception moment to expiration of the valid time range.

In other words, the terminal device does not need to monitor the downlink physical channel throughout the entire valid time range, but may choose to stop monitoring the downlink physical channel, provided that the second indication is obtained. A purpose thereof is to avoid some unnecessary monitoring operations, so as to save electric energy for the terminal device.

In some possible implementations, the method may further include:

starting, by the terminal device, a first timer when the second indication is received; and during running of the first timer, stopping, by the terminal device, monitoring the downlink physical channel.

Optionally, duration of the first timer may be stipulated in a protocol, be indicated by the network device (for example, indicated by using the first indication and/or the second indication), or be pre-configured in an RRC message. This is not limited in this embodiment of this application.

In some possible implementations, the method may further include:

when the first timer expires, starting, by the terminal device, a second timer; and during running of the second timer, monitoring, by the terminal device, the downlink physical channel, to obtain retransmission indication information of the downlink data.

According to a second aspect, a data transmission method is provided, including:

sending, by a network device, a first indication to a terminal device, where the first indication is used by the terminal device to receive downlink data based on the first indication and generate feedback information of the downlink data;

after obtaining an unlicensed channel, sending, by the network device, a second indication to the terminal device, where the second indication is used to indicate a start location of an uplink time unit; and receiving, by the network device, the feedback information sent by the terminal device at a resource location, where the resource location is determined by the terminal device based on the first indication and the second indication.

In this embodiment of this application, the network device may send the first indication to the terminal device, so that the terminal device receives the downlink data based on the first indication and generates the feedback information of the downlink data. Then, after obtaining the unlicensed channel, the network device may send the second indication to the terminal device, to notify the terminal device that the terminal device may share a transmission opportunity with the network device (a transmission opportunity is a usage time after the network device or the terminal device obtains a channel through channel detection), so that the terminal device needs to use only simple LBT (for example, 25 μs LBT) instead of LBT of a relatively long time (for example, rollback-mechanism-based LBT).

The network device may receive the feedback information sent by the terminal device at the resource location (corresponding to a terminal device side), where the resource location is determined by the terminal device based on the first indication and the second indication. Herein, the "resource location" may include a location of a time domain resource and/or a location of a frequency domain resource. To sum up, the network device sends the second indication to the terminal device, so that the resource location for the feedback information can be flexibly determined.

Optionally, the first indication includes a valid time range, and the sending a second indication to the terminal device includes:

sending the second indication to the terminal device within the valid time range.

In other words, the first indication is used to instruct the terminal device to receive, within the valid time range, the second indication sent by the network device.

It should be understood that, in this embodiment of this application, an operation of the network device corresponds to an operation of the terminal device, some concepts or terms thereof are the same or similar, and some descriptions are omitted herein to avoid repetition.

According to a third aspect, a data transmission method is provided, including: obtaining, by a terminal device, a first uplink grant sent by a network device;

transmitting, by the terminal device, uplink data based on the first uplink grant, and starting a first timer; and when or after the first timer expires, receiving, by the terminal device, feedback information that is of the uplink data and that is sent by the network device.

In this embodiment of this application, the terminal device may receive the feedback information that is of the uplink data and that is sent by the network device, so as to learn a decoding status of the network device.

In some possible implementations, the feedback information of the uplink data may be sent by the network device by using physical layer signaling or media access control MAC layer signaling.

In some possible implementations, when the feedback information of the uplink data is negative acknowledgement NACK information, the method may further include:

starting, by the terminal device, a retransmission timer; and monitoring, by the terminal device, a downlink physical channel during running of the retransmission timer, to obtain an uplink grant.

In some possible implementations, if the terminal device receives indication information sent by the network device, and the indication information is used to instruct the terminal device to perform new data transmission, the terminal device stops monitoring the downlink physical channel.

In some possible implementations, when the feedback information of the uplink data is acknowledgement information, the method may further include:

when a retransmission timer is running, stopping, by the terminal device, the retransmission timer.

Optionally, the retransmission timer may be a UL retransmission timer, or a UL retx timer for short.

Therefore, in this embodiment of this application, a feedback mechanism is introduced into an uplink asynchronous HARQ, so that the terminal device can learn a decoding status of the network device.

According to a fourth aspect, a data transmission method is provided, including:

obtaining, by a terminal device, semi-persistent scheduling configuration information;

obtaining, by the terminal device, a first indication sent by a network device, where the first indication is used to indicate an uplink resource;

determining, by the terminal device, at least one window based on the semi-persistent scheduling configuration information and the first indication;

generating, by the terminal device, at least one piece of uplink data;

receiving, by the terminal device within the at least one window, at least one second indication sent by the network device; and determining, by the terminal device based on the first indication and the at least one second indication, a resource location for sending the at least one piece of uplink data, and transmitting the at least one piece of uplink data at the resource location.

In this embodiment of this application, the terminal device configured with semi-persistent scheduling may alternatively perform only a first channel access solution (Channel Access Procedure) or first LBT (for example, 25 µs LBT) instead of rollback-mechanism-based LBT (implementation of which is relatively time consuming), thereby reducing both a channel contention time and a data transmission delay.

In some possible implementations, the semi-persistent scheduling configuration information includes at least one of semi-persistent scheduling period information, semi-persistent scheduling window length information, semi-persistent scheduling cell list information, or semi-persistent scheduling HARQ process information. The cell list information indicates a quantity of cells used for semi-persistent scheduling. Optionally, the semi-persistent scheduling configuration information may be sent by using an RRC message.

In some possible implementations, optionally, the semi-persistent scheduling configuration information may include a plurality of sets of semi-persistent scheduling configuration information, and each configuration set may be associated with a configuration identifier ID. Optionally, the plurality of sets of semi-persistent scheduling configuration information may differ in period and/or window length.

In some possible implementations, the terminal device may determine a semi-persistent scheduling periodic window based on the semi-persistent scheduling configuration information and the first indication. For example, the terminal device may determine a window start location and a periodic window starting from the window start location.

In some possible implementations, the terminal device may monitor a downlink physical channel during a period in which the window is open, to obtain the second indication.

In some possible implementations, when a discontinuous reception DRX mechanism is configured for the terminal device by the network device, if the second indication is received during the period in which the window is open, monitoring of the downlink physical channel is stopped from a reception moment to a window closing moment.

In other words, if the terminal device obtains the second indication, the terminal device may choose not to continue monitoring the downlink physical channel, that is, does not need to monitor the downlink physical channel throughout the entire window.

In some possible implementations, the method may further include:

starting, by the terminal device, a first timer when the second indication is received; and during running of the first timer, stopping, by the terminal device, monitoring the downlink physical channel.

Similarly, in a scenario in which the terminal device is configured with semi-persistent scheduling, the terminal device may also start the first timer, and during running of the first timer, the terminal device stops monitoring the downlink physical channel, to save power.

In some possible implementations, the method may further include:

when the first timer expires, starting, by the terminal device, a second timer; and during running of the second timer, monitoring, by the terminal device, the downlink physical channel, to obtain a retransmission indication of downlink data.

In some possible implementations, the method may further include:

obtaining, by the terminal device, a third indication, where the third indication is used for changing a current semi-persistent scheduling configuration; and changing, by the terminal device, the at least one of the semi-persistent scheduling period information, the semi-persistent scheduling window length information, the semi-persistent scheduling cell list information, or the semi-persistent scheduling HARQ process information based on the third indication.

Optionally, the third indication may specifically indicate a configuration ID for changing. For example, the terminal device may update, based on the configuration ID, the current semi-persistent scheduling configuration to a semi-persistent scheduling configuration corresponding to the configuration ID.

Optionally, the third indication may be sent by using a PDCCH message, a MAC message, or an RRC message.

According to a fifth aspect, a terminal device is provided, and is configured to perform the method according to any one of the first aspect or the possible implementations of the first aspect. Specifically, the apparatus includes a unit that is configured to perform the method according to any one of the first aspect or the possible implementations of the first aspect.

According to a sixth aspect, a network device is provided, and is configured to perform the method according to any one of the second aspect or the possible implementations of the second aspect. Specifically, the apparatus includes a unit that is configured to perform the method according to any one of the second aspect or the possible implementations of the second aspect.

According to a seventh aspect, a terminal device is provided, and is configured to perform the method according to any one of the third aspect or the possible implementations of the third aspect. Specifically, the apparatus includes a unit that is configured to perform the method according to any one of the third aspect or the possible implementations of the third aspect.

According to an eighth aspect, a terminal device is provided, and is configured to perform the method according to any one of the fourth aspect or the possible implementations of the fourth aspect. Specifically, the apparatus includes a unit that is configured to perform the method according to any one of the fourth aspect or the possible implementations of the fourth aspect.

According to a ninth aspect, a terminal device is provided. The terminal device includes a processor, a memory, and a communications interface. The processor is connected to the memory and the communications interface. The memory is configured to store an instruction. The processor is configured to execute the instruction. The communications interface is configured to communicate with another network element under control of the processor. When the processor executes the instruction stored in the memory, the execution enables the processor to perform the method according to any one of the first aspect or the possible implementations of the first aspect.

According to a tenth aspect, a network device is provided. The network device includes a processor, a memory, and a communications interface. The processor is connected to the memory and the communications interface. The memory is configured to store an instruction. The processor is configured to execute the instruction. The communications interface is configured to communicate with another network element under control of the processor. When the processor executes the instruction stored in the memory, the execution enables the processor to perform the method according to any one of the second aspect or the possible implementations of the second aspect.

According to an eleventh aspect, a terminal device is provided. The terminal device includes a processor, a memory, and a communications interface. The processor is connected to the memory and the communications interface. The memory is configured to store an instruction. The processor is configured to execute the instruction. The communications interface is configured to communicate with another network element under control of the processor. When the processor executes the instruction stored in the memory, the execution enables the processor to perform the method according to any one of the third aspect or the possible implementations of the third aspect.

According to a twelfth aspect, a terminal device is provided. The terminal device includes a processor, a memory, and a communications interface. The processor is connected to the memory and the communications interface. The memory is configured to store an instruction. The processor is configured to execute the instruction. The communications interface is configured to communicate with another network element under control of the processor. When the processor executes the instruction stored in the memory, the execution enables the processor to perform the method according to any one of the fourth aspect or the possible implementations of the fourth aspect.

According to a thirteenth aspect, a computer readable storage medium is provided. The computer readable storage medium stores a program. The program enables a terminal device to perform the data transmission method according to any one of the first aspect or the implementations of the first aspect.

According to a fourteenth aspect, a computer readable storage medium is provided. The computer readable storage medium stores a program. The program enables a network device to perform the data transmission method according to any one of the second aspect or the implementations of the second aspect.

According to a fifteenth aspect, a computer readable storage medium is provided. The computer readable storage medium stores a program. The program enables a terminal device to perform the data transmission method according to any one of the third aspect or the implementations of the third aspect.

According to a sixteenth aspect, a computer readable storage medium is provided. The computer readable storage medium stores a program. The program enables a terminal device to perform the data transmission method according to any one of the fourth aspect or the implementations of the fourth aspect.

According to a seventeenth aspect, a computer program product including an instruction is provided. When the computer program product runs on a computer, the computer is enabled to perform the method according to any one of any foregoing aspect or the possible implementations thereof.

According to an eighteenth aspect, a communications chip is provided. The communications chip stores an instruction. When the instruction runs on a communications chip, the communications chip is enabled to perform the method according to any one of any foregoing aspect or the possible implementations thereof.

DESCRIPTION OF EMBODIMENTS

The following describes technical solutions in embodiments of this application with reference to accompanying drawings.

It should be understood that the technical solutions in the embodiments of this application may be applied to various communications systems, for example, current communications systems such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, and a universal mobile telecommunications system (UMTS), and particularly, may be applied to a future 5G new radio (NR) system or a 5G system.

It should be further understood that, in the embodiments of this application, a network device may also be referred to as a network device side, a base station, or the like, and the base station may be a base transceiver station (BTS) in GSM or CDMA, may be a NodeB (NodeB) in WCDMA, may be an evolved NodeB (, eNB or eNodeB) in LTE, or may be a base station device gNB in a future 5G network, or the like. This is not limited in the present invention.

It should be further understood that, in the embodiments of this application, a terminal device may communicate with one or more core networks (Core Network) through a radio access network RAN), and the terminal device may be referred to as an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, or the like.

FIG. 1 is a schematic diagram of a scenario. It should be understood that, for ease of understanding, the scenario in FIG. 1 is used herein as an example for description, but does not constitute any limitation on the present invention. FIG. 1 shows a terminal device 11, a terminal device 12, a terminal device 13, and a base station 21.

As shown in FIG. 1, the terminal device 11 may communicate with the base station 21, the terminal device 12 may communicate with the base station 21, and the terminal device 13 may communicate with the base station 21. Alternatively, the terminal device 12 may communicate with the terminal device 11. Alternatively, in another case, the terminal device 13 communicates with the terminal device 12.

Currently, in a communication process between a terminal device and a base station, for downlink (DL) scheduling, the terminal device receives an indication (assignment) sent by the base station. The assignment directly indicates a transmission resource (time-frequency resource) on which downlink data is located, and a modulation and coding scheme. The terminal device may transmit the downlink data based on the transmission resource. For example, the terminal device receives the downlink data in a downlink subframe indicated by the base station, attempts to decode the downlink data, then generates a feedback result, that is, a hybrid automatic repeat request (HARQ) feedback (feedback), and sends the feedback result after four subframes subsequent to the downlink subframe. In the prior art, before sending the feedback result, the terminal device does not perform listen before talk (LBT) for channel contention. Consequently, a time-frequency resource location for the feedback result cannot be flexibly determined.

Therefore, this application intends to provide a data transmission method, attempting to flexibly determine a resource location for feedback information based on a first indication and a second indication that are sent by a network device.

FIG. 2 is a schematic flowchart of a data transmission method 200 according to an embodiment of this application. The method 200 may be performed by a terminal device. For example, the terminal device may be the terminal device 11, the terminal device 12, or the terminal device 13 in FIG. 1. Correspondingly, a network device that communicates with the terminal device may be the base station 21 in FIG. 1. As shown in FIG. 2, the method 200 includes the following steps.

S210: The terminal device receives a first indication sent by the network device.

Optionally, the first indication may be used to indicate at least one of a valid time range for receiving a second indication, a relative time position of feedback information, an LBT type (for example, 25 µs LBT, rollback-mechanism-based LBT, or another type), a time-frequency resource location of downlink data, a modulation and coding scheme of the downlink data, a HARQ process used for the downlink data, whether the downlink data is newly transmitted or retransmitted, or a redundancy version used for the downlink data, or other information that may be used during data transmission. This is not limited.

Optionally, in this embodiment of this application, the valid time range may include a time unit.

Optionally, the first indication may be sent by the network device on a downlink physical channel. For example, the first indication is sent on a physical downlink control channel (PDCCH), or the first indication may be sent on a physical downlink shared channel (PDSCH).

Optionally, the first indication or a cyclic redundancy check (CRC) code of the first indication may be scrambled by using a cell identity of the terminal device, for example, a cell radio network temporary identifier (C-RNTI).

In this embodiment of this application, the first indication is used to indicate a resource, for example, a time domain resource and/or a frequency domain resource, used by the terminal device for receiving the downlink data from the network device.

S220: The terminal device receives the downlink data based on the first indication, and generates feedback information of the downlink data.

In other words, the terminal device may receive the downlink data based on the first indication, and generate the feedback information of the downlink data. The feedback information is used to notify the network device whether the downlink data is successfully decoded by the terminal device, so that the network device determines whether to retransmit the downlink data. For example, if the terminal device successfully decodes the downlink data, the generated feedback information is acknowledgement (ACK) information; or if the terminal device fails to decode the downlink data, the generated feedback information is negative acknowledgement (NACK) information.

In this embodiment of this application, a chronological order of a time unit in which the terminal device "receives a first indication sent by the network device" and a time unit in which the terminal device "generates feedback information of the downlink data" is not limited.

Optionally, a time unit in which the first indication is transmitted and a time unit in which the downlink data is transmitted may be a same time unit, or may be different time units. Optionally, if the time units are different time units, the first indication may further indicate a time unit offset, so that the terminal device determines, based on the first indication, the time unit in which the downlink data is transmitted.

In this embodiment of this application, the method 200 may be applied to an unlicensed cell, for example, an unlicensed spectrum cell. The unlicensed spectrum cell may operate on an unlicensed spectrum. The unlicensed spectrum may be an entire block of contiguous spectrum resources. For example, 160 MHz is divided into a plurality of channels, and a bandwidth of a channel is preset, for example, 20 megahertz (MHz). The terminal device or the network device obtains one or more channels through clear channel detection. The unlicensed spectrum may be understood as unlicensed spectra of 2.4 gigahertz (GHz) to 2.6 GHz, 4 GHz to 7 GHz, and 30 GHz to 70 GHz, or may be understood as a spectrum resource that can be shared with an institute of electrical and electronics engineers (IEEE) wireless local area network (WLAN). It may be further understood that the unlicensed spectrum cell may be a cell for which clear channel detection needs to be performed before data is sent (by the network device and/or the terminal device). The unlicensed spectrum cell may further include a licensed-assisted access (LAA) cell. The LAA cell cannot operate independently, and is a cell that can operate only with assistance of a licensed spectrum cell. Specifically, carriers between the LAA cell and the licensed spectrum cell are aggregated, and the LAA cell and the licensed spectrum cell belong to a same base station. However, the LAA cell can serve only as a secondary cell (SCell) of the base station, and cannot serve as a primary cell (PCell) of the base station.

It should be understood that, in this embodiment of this application, a "time unit" or a "time domain scheduling unit" is a unit for time domain resource allocation, and may be specifically a time unit such as a slot, a mini-slot, a subframe, an orthogonal frequency division multiplexing (OFDM) symbol, or a transmission time interval (TTI), or may be a term newly defined in 5G. This is not limited.

S230: The terminal device receives a second indication sent by the network device, where the second indication is used to indicate a start location of an uplink time unit.

Optionally, the second indication may further include duration information, that is, information about a time length for sending the feedback information.

Optionally, the second indication or CRC of the second indication may be scrambled by using the cell identity of the terminal device. For example, the second indication is scrambled by using the C-RNTI. Correspondingly, only the terminal device can accurately obtain the second indication by using the cell identity C-RNTI of the terminal device. Alternatively, the second indication or CRC of the second indication may be scrambled by using a common identity. For example, the second indication is scrambled by using a cell common radio network temporary identifier (CC- RNTI). All terminal devices in a cell can obtain the second indication by using the CC-RNTI. Alternatively, the second indication may be scrambled by using an identity of a UE group. Only UE in the UE group can obtain the second indication by using the group identity. The group identity may be configured by the network device by using a radio resource control (RRC) message.

S240: The terminal device determines, based on the first indication and the second indication, a resource location for sending the feedback information.

Specifically, the terminal device may determine the (time-frequency) resource location for the feedback information based on the relative time position of the feedback information indicated by the first indication and a start location of at least one uplink time unit indicated by the second indication. The "start location" may be a specific time unit.

Herein, the "resource location" may include a location of a time domain resource and/or a location of a frequency domain resource.

For example, the first indication may indicate that a relative time is k1 (k1 is a natural number), the second indication may indicate that a relative time is k2 (k2 is a natural number), and a time unit in which the second indication is received may be a subframe N (N is a natural number and indicates a subframe number). In this case, a time unit of the "time-frequency resource location" may be a subframe N+k1+k2.

Optionally, the first indication or the second indication may indicate (in a form of direct indication or a form of indirect indication) a frequency domain resource for sending the feedback information. For example, "indirect indication" means that the terminal device can obtain the frequency domain resource for the feedback information through mapping based on a start location or an end location of a control channel element (CCE) or another resource unit of the first indication or the second indication sent by the network device. The CCE is a resource unit for PDCCH resource allocation. One CCE may include nine resource element groups (REG). One REG includes four contiguous unoccupied resource elements (RE).

Optionally, the time-frequency resource location for the feedback information may be alternatively determined only by the second indication. This is not limited in this embodiment of this application. For example, the second indication may indicate the time-frequency resource location for the feedback information.

S250: The terminal device sends the feedback information at the resource location.

Optionally, the feedback information may be sent on an uplink (UL) control channel or an uplink data channel, for example, a physical uplink control channel (PUCCH), a physical uplink shared channel (PUSCH), or another channel term newly defined in 5G. This is not limited.

In this embodiment of this application, the terminal device may receive the first indication sent by the network device; receive the downlink data based on the first indication, and generate the feedback information of the downlink data; then receive the second indication sent by the network device, where the second indication is used to indicate the start location of the uplink time unit; determine, based on the first indication and the second indication, the resource location for sending the feedback information; and finally, send the feedback information at the resource location. In this way, the resource location for the feedback information can be flexibly determined.

In this embodiment of this application, the first indication may include the valid time range, where the first indication is used to instruct the terminal device to receive, within the valid time range, the second indication sent by the network device.

In other words, the terminal device may obtain the valid time range based on the first indication, and then may monitor a downlink physical channel based on the valid time range, to obtain the second indication sent by the network device.

In other words, before sending the feedback information, the terminal device may perform clear channel detection by using a first channel access solution (Channel Access Procedure) or first LBT (for example, 25 μs LBT), and detect that the channel is a clear channel.

In this way, the terminal device needs to perform only 25 μs LBT instead of rollback-mechanism-based LBT (implementation of which is relatively time consuming), thereby reducing both a channel contention time and a data transmission delay.

Specifically, for example, clear channel detection (CCA) or listen before talk LBT is a fair channel contention mechanism, and may include energy-detection-based (E-LBT) clear channel detection and waveform-detection-based (W-LBT) clear channel detection. Energy-detection-based clear channel detection means that a network device or a terminal device performs signal strength detection on contiguous or non-contiguous frequency domain resources of a specific bandwidth (for example, 20 MHz, 40 MHz, 80 MHz, or 160 MHz). If signal strength is greater than a specific threshold, it indicates that a channel is busy and data cannot be sent on the channel; or if signal strength is less than or equal to a specific threshold, it is considered that a channel is clear and data can be sent on the channel. Waveform-detection-based clear channel detection means: A network or a terminal device detects a waveform; and if a corresponding waveform is detected, it indicates that a channel is busy; otherwise, it is considered that a channel is idle.

In this embodiment of this application, 25 μs LBT may be understood as E-LBT that is based on fixed duration. If signal strength detected within the fixed duration is less than a specific threshold, it is considered that a channel is clear. This may be understood as: If a terminal device obtains the channel, the terminal device may send data.

In this embodiment of this application, the first indication or the second indication may indicate an LBT type used by the terminal device. For example, the first indication may directly or indirectly indicate that the terminal device uses 25 μs LBT for channel detection.

Further, the first indication and/or the second indication may indicate a time domain range location for performing LBT. Specifically, the first indication may indicate a first relative time and a second relative time, and the second indication may indicate a first time unit. In this case, the terminal device may determine the time domain range location based on the first time unit, the first relative time, and the second relative time, and perform LBT at the time domain range location.

For example, for 12 symbols in one subframe, the first indication may indicate that the first relative time is k (k is a natural number) subframes and the second relative time is the first symbol in a subframe, and the second indication may indicate that the first time unit is a subframe N (N is a natural number and indicates a subframe number). In this case, the time domain range location determined by the terminal device is the first symbol in a subframe N+k, and the terminal device performs 25 μs LBT in the first symbol in the subframe N+k.

Alternatively, the first indication may directly specify at least one time domain range location for performing LBT. For example, the first indication directly specifies a symbol in a subframe for performing 25 μs LBT.

It should be understood that the "time domain range location" at which the terminal device performs 25 μs LBT is described only by using a subframe and a symbol as an example, and the "time domain range location" may be alternatively expressed by using another time granularity, for example, a time unit such as one or more consecutive OFDM symbols or a slot. This is not limited in this embodiment of this application.

In this embodiment of this application, the method 200 may further include:

when a discontinuous reception (DRX) mechanism is configured for the terminal device by the network device, if the second indication is received within the valid time range, stopping monitoring the downlink physical channel from a reception moment to expiration of the valid time range.

In this embodiment of this application, the terminal device may monitor the downlink physical channel between a time at which the first indication is received and a time at which the second indication is received. A purpose of "monitoring the downlink physical channel" is to obtain the second indication. Optionally, "monitoring the downlink physical channel" may be alternatively implemented by setting a timer. This is not limited. Herein, if the terminal device is configured with the DRX mechanism, and receives the second indication within the valid time range, the terminal device may stop monitoring the downlink physical channel from the moment at which the second indication is received to expiration of the valid time range. In other words, the terminal device does not need to monitor the downlink physical channel throughout the entire valid time range, but may choose to stop monitoring the downlink physical channel, provided that the second indication is obtained. A purpose thereof is to avoid some unnecessary monitoring operations, so as to save electric energy for the terminal device.

In this embodiment of this application, the downlink physical channel monitored by the terminal device may be a physical channel of a serving cell, for example, a serving cell in which the first indication and/or the downlink data are/is transmitted, or may be a physical channel of at least one activated serving cell.

It should be understood that, in this embodiment of this application, whether the downlink physical channel needs to be monitored beyond the valid time range may not be limited, and the terminal device may determine, depending on a requirement, whether to perform monitoring.

Optionally, in an embodiment, the method 200 may further include:

starting, by the terminal device, a first timer when the second indication is received; and during running of the first timer, stopping, by the terminal device, monitoring the downlink physical channel.

Specifically, when the second indication is received, the terminal device may start a timer (for example, the first timer), and then, during running of the first timer, the terminal device may stop monitoring the downlink physical channel. The terminal device may choose to stop monitoring the downlink physical channel, provided that the second indication is obtained. A purpose thereof is to avoid some unnecessary monitoring operations, so as to save electric energy for the terminal device.

Optionally, a time unit in which the terminal device starts the first timer may be the same as a time unit in which the terminal device sends the feedback information, or may be a time unit after the time unit in which the terminal device sends the feedback information. This is not limited in this embodiment of this application. Optionally, if the terminal device successfully decodes the downlink data, the terminal device may not start the first timer; or if the terminal device fails to decode the downlink data, the terminal device may start the first timer.

Optionally, duration of the first timer may be stipulated in a protocol, be indicated by the network device (for example, indicated by using the first indication and/or the second indication), or be pre-configured in an RRC message. This is not limited in this embodiment of this application. Optionally, the first timer may be a HARQ round trip time (RTT) timer, or may be a timer with another name. This is not limited in this embodiment of this application.

Optionally, in an embodiment, the method 200 may further include:

when the first timer expires, starting, by the terminal device, a second timer; and during running of the second timer, monitoring, by the terminal device, the downlink physical channel, to obtain retransmission indication information of the downlink data.

Specifically, the terminal device may start the second timer after the first timer expires. For example, the second timer may be a retransmission timer (Retransmission Timer), or a retx timer for short. Then, during running of the second timer, the terminal device may monitor the downlink physical channel, to obtain possible retransmission indication information of the downlink data. Alternatively, this may be understood as: The terminal device is not allowed to sleep during running of the retransmission timer. Herein, the downlink physical channel monitored by the terminal device may alternatively be a downlink physical channel of a cell or at least one cell. This is not limited.

Optionally, duration of the second timer may also be stipulated in a protocol, be indicated by the network device (for example, indicated by using the first indication and/or the second indication), or be pre-configured in an RRC message. This is not limited in this embodiment of this application.

Therefore, in this embodiment of this application, the terminal device may receive the first indication sent by the network device; receive the downlink data based on the first indication, and generate the feedback information of the downlink data; then receive the second indication sent by the network device, where the second indication is used to indicate the start location of the uplink time unit; determine, based on the first indication and the second indication, the resource location for sending the feedback information; and finally, send the feedback information at the resource location. In this way, the resource location for the feedback information can be flexibly determined.

The following describes a data transmission method according to an embodiment of this application with reference to an example in FIG. 3. As shown in FIG. 3, a terminal device may receive a first indication and downlink DL data that are sent by a network device, and monitor a downlink physical channel within a valid time range (for example, subframes included in a dashed-line box in FIG. 3) indicated by the first indication, to obtain a second indication. The terminal device may determine a subframe location based on the first indication and the second indication, and send feedback information of the downlink data at the subframe location. Optionally, the terminal device may also perform channel detection at the subframe location.

The foregoing has described the data transmission method according to the embodiments of this application from a terminal device side. The following provides descriptions from a network device side. For brevity, some repeated terms or concepts are not described again.

FIG. 4 is a schematic flowchart of a data transmission method 400 according to another embodiment of this application. The method 400 may be performed by a network device. For example, the network device may be the base station 21 in FIG. 1. Correspondingly, a terminal device that communicates with the network device may be the terminal device 11, the terminal device 12, or the terminal device 13 in FIG. 1. As shown in FIG. 4, the method 400 includes the following steps.

S410: The network device sends a first indication to the terminal device, where the first indication is used by the terminal device to receive downlink data based on the first indication and generate feedback information of the downlink data.

S420: After obtaining an unlicensed channel, the network device sends a second indication to the terminal device, where the second indication is used to indicate a start location of an uplink time unit.

S430: The network device receives the feedback information sent by the terminal device at a resource location, where the resource location is determined by the terminal device based on the first indication and the second indication.

In this embodiment of this application, the network device may send the first indication to the terminal device, so that the terminal device receives the downlink data based on the first indication and generates the feedback information of the downlink data. Then, after obtaining the unlicensed channel, the network device may send the second indication to the terminal device, to notify the terminal device that the terminal device may share a transmission opportunity with the network device (a transmission opportunity is a usage time after the network device or the terminal device obtains a channel through channel detection), so that the terminal device needs to use only simple LBT (for example, 25 μs LBT) instead of LBT of a relatively long time (for example, rollback-mechanism-based LBT). The network device may receive the feedback information sent by the terminal device at the resource location (corresponding to a terminal device side), where the resource location is determined by the terminal device based on the first indication and the second indication. To sum up, the network device sends the second indication to the terminal device, so that the resource location for the feedback information can be flexibly determined.

Optionally, the first indication includes a valid time range, and the sending a second indication to the terminal device includes:

sending the second indication to the terminal device within the valid time range.

Specifically, the network device may send the second indication to the terminal device within the valid time range.

In other words, the first indication is used to instruct the terminal device to receive, within the valid time range, the second indication sent by the network device.

Specifically, the network device may notify the terminal device of the valid time range by using the first indication, so that the terminal device receives, within the valid time range, the second indication sent by the network device.

It should be understood that, in this embodiment of this application, an operation of the network device corresponds to an operation of the terminal device, some concepts or terms thereof are the same or similar, and some descriptions are omitted herein to avoid repetition.

Currently, for an uplink asynchronous HARQ, there is no explicit HARQ feedback. A terminal device can indirectly learn, only based on a new data indicator (NDI) field in a PDCCH grant, whether previously transmitted data is successfully decoded by a network device. Specifically, if the PDCCH grant indicates new transmission, it indicates that the previously transmitted data is successfully decoded by the network device; or if the PDCCH grant indicates retransmission, it indicates that the previously transmitted data is not successfully decoded by the network device. Therefore, in the prior art, there is no explicit feedback mechanism for the uplink asynchronous HARQ. This may cause a problem that there is no feedback for last data transmission of the uplink asynchronous HARQ, and the terminal device cannot learn a decoding status of the network device. Consequently, data transmission performance is affected.

In view of the foregoing problem, this application provides a solution in which a feedback mechanism is introduced into an uplink asynchronous HARQ so that a terminal device can learn a decoding status of a network device. The following describes the solution with reference to FIG. 5.

FIG. 5 is a schematic flowchart of a data transmission method 500 according to still another embodiment of this application. The method 500 may be applied to an unlicensed cell and a licensed cell. The method 500 may be performed by a terminal device. For example, the terminal device may be the terminal device 11, the terminal device 12, or the terminal device 13 in FIG. 1. Correspondingly, a network device that communicates with the terminal device may be the base station 21 in FIG. 1. As shown in FIG. 5, the method 500 includes the following steps.

S510: The terminal device obtains a first uplink grant sent by the network device.

S520: The terminal device transmits uplink data based on the first uplink grant, and starts a first timer.

S530: When or after the first timer expires, the terminal device receives feedback information that is of the uplink data and that is sent by the network device.

Specifically, the terminal device may obtain the first uplink grant sent by the network device, then generate the uplink data based on the first uplink grant, and transmit the data. Optionally, the terminal device may determine a first HARQ process (HARQ process) based on the first uplink grant, and perform one uplink transmission by using the first HARQ process. The uplink transmission may be new transmission or retransmission. Optionally, the terminal device may further start the first timer, and when the first timer expires, receive the feedback information that is of the uplink data and that is sent by the network device. Therefore, the terminal device may receive the feedback information that is of the uplink data and that is sent by the network device, thereby learning a decoding status of the network device.

Optionally, the feedback information of the uplink data may be sent by the network device by using physical layer signaling or media access control MAC layer signaling. For example, the physical layer signaling may include PDCCH signaling, PDSCH signaling, or physical hybrid automatic repeat request indicator channel (PHICH) signaling. The MAC layer signaling may include a media access control element (MAC CE) or the like.

Optionally, the first timer may be a UL round trip time (RTT) timer timer. Duration of the UL RTT timer may be pre-stipulated in a protocol, or may be pre-configured by the network device.

Optionally, in an embodiment, when the feedback information of the uplink data is negative acknowledgement NACK information, the method 500 may further include:

starting, by the terminal device, a retransmission timer; and monitoring, by the terminal device, a downlink physical channel during running of the retransmission timer, to obtain an uplink grant.

Specifically, when the received feedback information is the NACK information, if the retransmission timer is not running, the terminal device may start the retransmission timer, and then monitor the downlink physical channel during running of the retransmission timer, to obtain a possible uplink retransmission indication (for example, the uplink grant). In another case, when the received feedback information is ACK information, if the retransmission timer is running, the terminal device stops the retransmission timer, and stops monitoring the downlink physical channel.

In this embodiment of this application, if the first timer expires, there may be a plurality of cases of whether the terminal device starts the retransmission timer, as shown in Table 1 below.

TABLE 1

Figure 1:
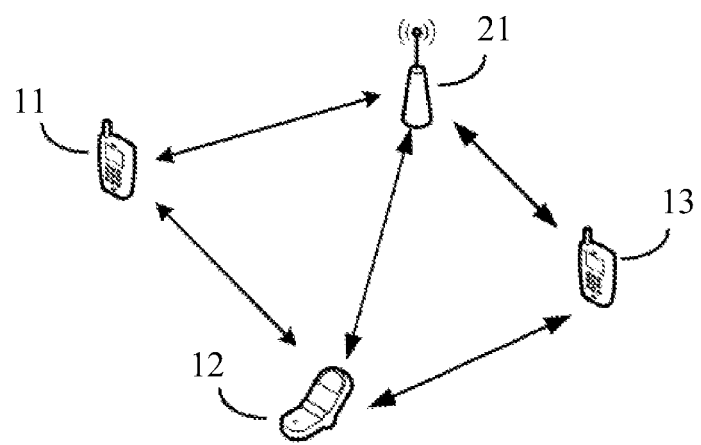
FIG. 1 is a schematic diagram of an application scenario.
Figure 2:
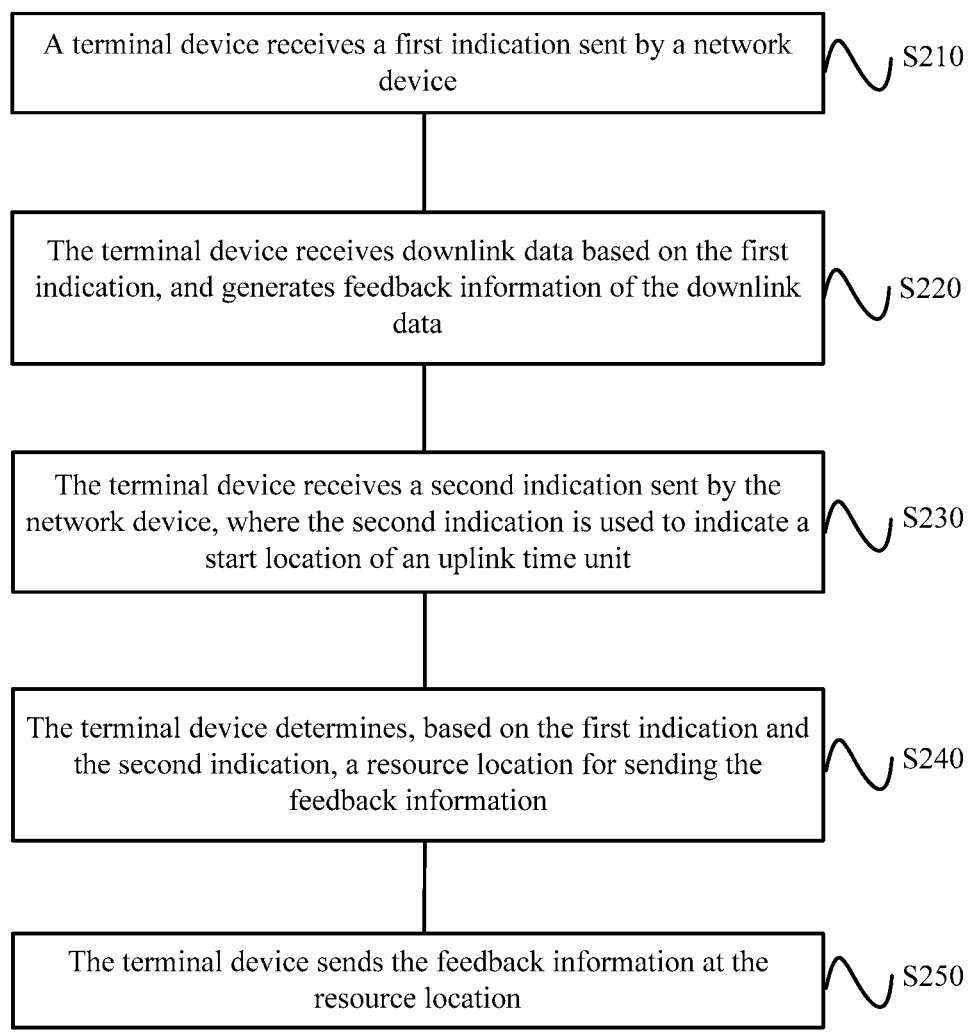
FIG. 2 is a schematic flowchart of a data transmission method according to an embodiment of this application.
Figure 3:
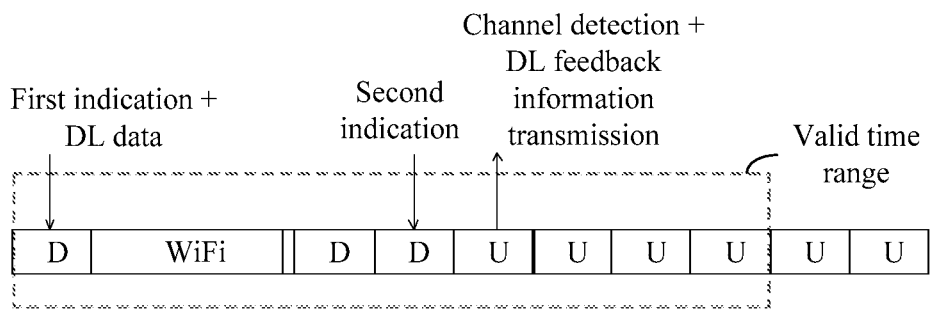
FIG. 3 is a schematic diagram of an example according to an embodiment of this application.
Figure 4:
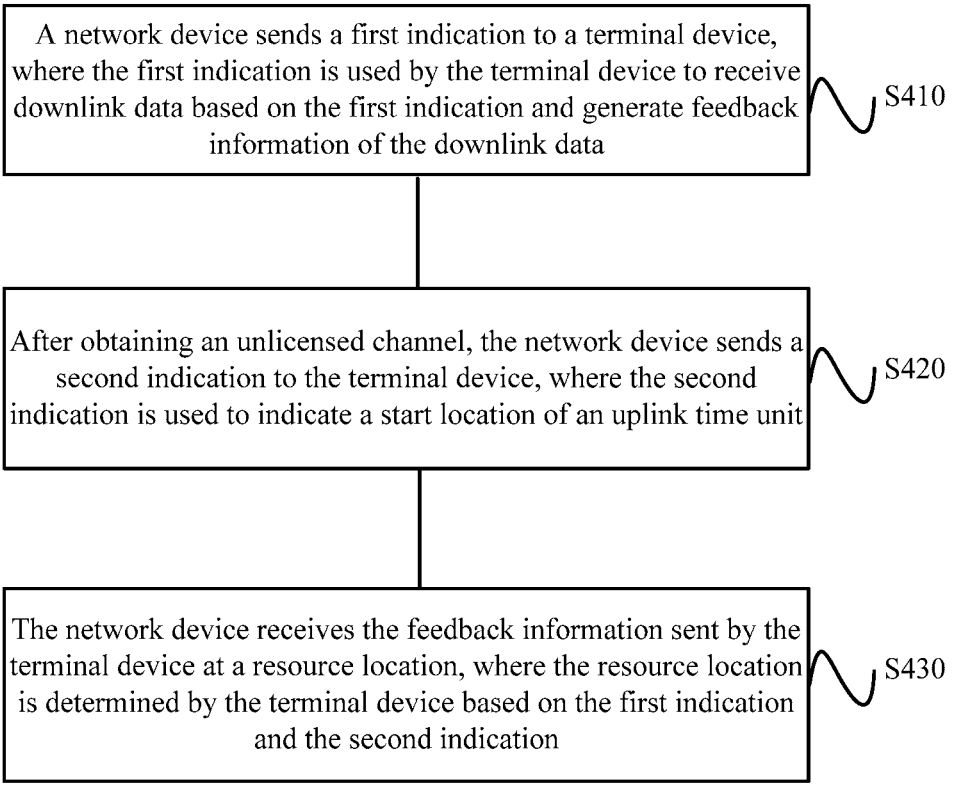
FIG. 4 is a schematic flowchart of a data transmission method according to another embodiment of this application.
Figure 5:
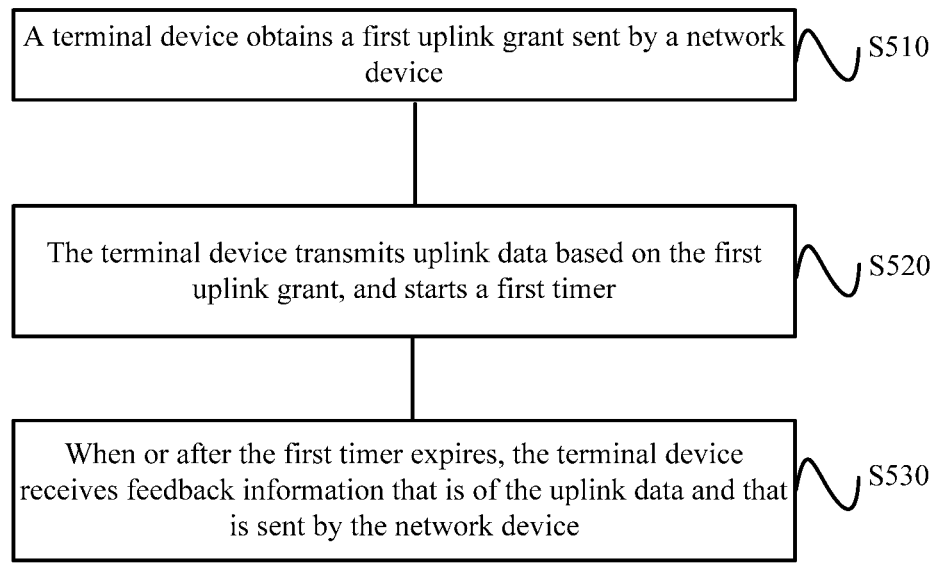
FIG. 5 is a schematic flowchart of a data transmission method according to still another embodiment of this application.

Six cases of whether to start a retransmission timer

| case | Uplink feedback in a subframe N | Uplink grant in the subframe N UL Grant In subframe N | Whether to start the retx timer in the subframe N after an RTT timer expires? Whether to start UL retx timer when RTT timer expires In subframe N? |
|---|---|---|---|
| 1 | Acknowledgement ACK | Indicating new transmission NDI with toggled | No. Next new transmission has not yet been performed. No, the next new transmission has not been performed. |
| 2 | Acknowledgement ACK | Indicating retransmission NDI without toggled | No. Next new transmission has not yet been performed. No, the next retransmission has not been performed. |
| 3 | Acknowledgement ACK | No grant resource No grant | No. Previous transmission has been successfully decoded. No, the previous transmission has been decoded. |
| 4 | Negative acknowledgement NACK | Indicating new transmission NDI with toggled | No. Next new transmission has not yet been performed. No, the next new transmission has not been performed. |
| 5 | Negative acknowledgement NACK | Indicating retransmission NDI without toggled | No. Next new transmission has not yet been performed. No, the next retransmission has not been performed. |
| 6 | Negative acknowledgement NACK | No grant resource No grant | Yes. Monitor a PDCCH to obtain a retransmission grant. Yes, monitor PDCCH for retransmission grant |

It can be learned from Table 1 that, in the sixth case, the terminal device starts the retransmission timer, and monitors the downlink physical channel, to obtain a possible retransmission indication.

Optionally, the retransmission timer may be a UL retransmission timer, or a UL retx timer for short.

Optionally, in an embodiment, the method 500 may further include:

if the terminal device receives indication information sent by the network device, and the indication information is used to instruct the terminal device to perform new data transmission, stopping, by the terminal device, monitoring the downlink physical channel.

In other words, if the terminal device receives the indication information sent by the network device, and the indication information is used to instruct the terminal device to perform new data transmission (for example, the first HARQ process), the terminal device stops monitoring the downlink physical channel, or stops the retransmission timer. In this way, electric energy of the terminal device can be saved.

Optionally, in an embodiment, when the feedback information of the uplink data is acknowledgement information, the method 500 may further include:

when a retransmission timer is running, stopping, by the terminal device, the retransmission timer.

Specifically, if the feedback information of the uplink data is the ACK information, the terminal device may consider that the network device has successfully decoded the uplink data. In this case, if the retransmission timer is running, the terminal device may stop the retransmission timer. In this way, electric energy of the terminal device can be saved.

Therefore, in this embodiment of this application, a feedback mechanism is introduced into an uplink asynchronous HARQ, so that the terminal device can learn a decoding status of the network device.

Currently, for a semi-persistent scheduling (SPS) scenario, a terminal device performs, after obtaining semi-persistent scheduling configuration information, one uplink transmission (new transmission or retransmission) only on a same frequency domain resource in one subframe every other period based on the semi-persistent scheduling configuration information. Consequently, a resource location for data transmission in SPS cannot be flexibly determined. An asynchronous uplink HARQ mechanism is used for semi-persistent scheduling.

Semi-persistent scheduling may be applied to services such as voice and data, or communications services such as an enhanced mobile broadband (eMBB) service, an ultra-reliable and low latency communications (URLLC) service, and a machine type communication (MTC) service.

Figure 6:
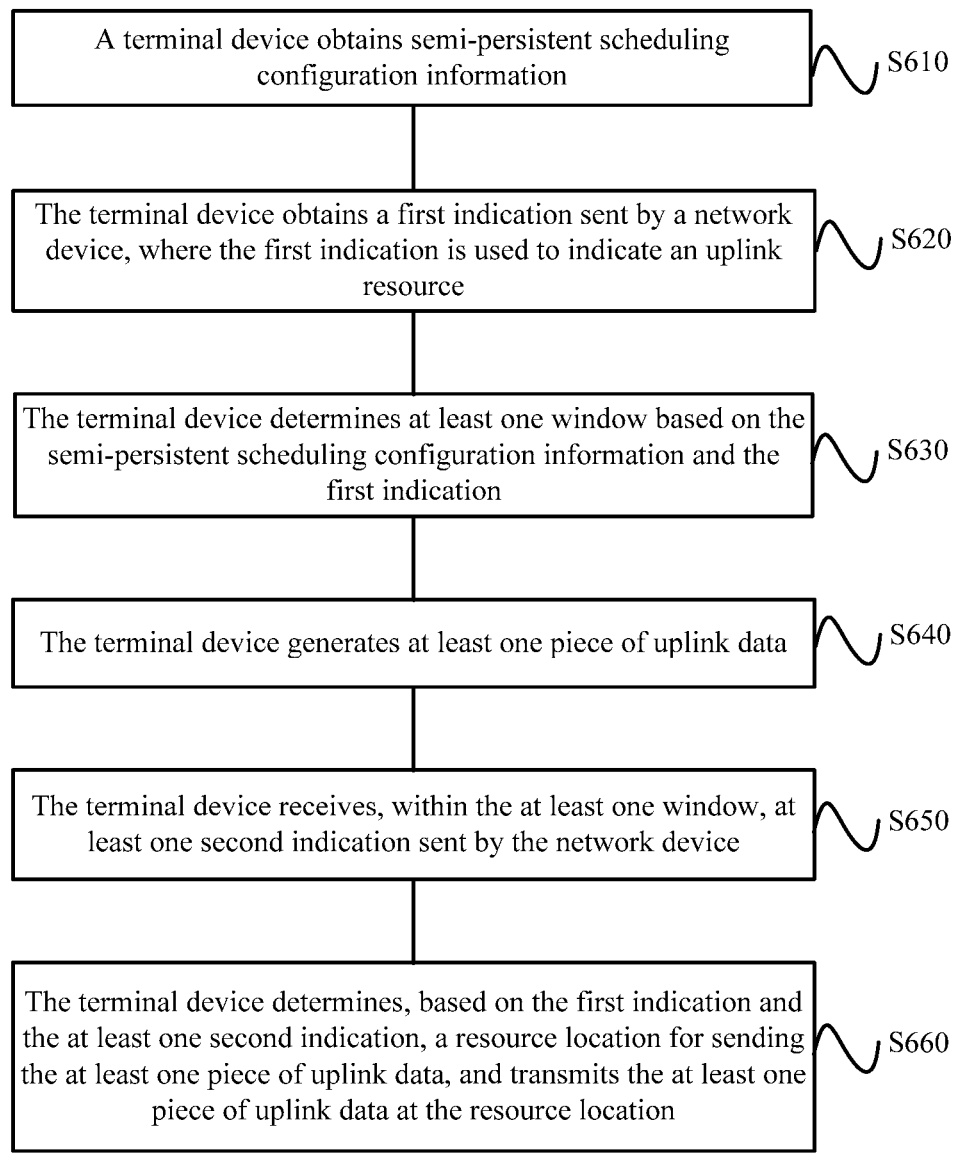
FIG. 6 is a schematic flowchart of a data transmission method according to another embodiment of this application.

In view of the foregoing problem, an embodiment of this application provides a solution in which a second indication (a function of the second indication may be similar to that of the second indication in the method 200) is introduced into SPS so that a resource location for data transmission in SPS can be flexibly determined. The following describes the solution with reference to FIG. 6. FIG. 6 is a schematic flowchart of a data transmission method 600 according to another embodiment of this application. The method 600 may be applied to an unlicensed cell. The method 600 may be performed by a terminal device. For example, the terminal device may be the terminal device 11, the terminal device 12, or the terminal device 13 in FIG. 1. Correspondingly, a network device that communicates with the terminal device may be the base station 21 in FIG. 1. As shown in FIG. 6, the method 600 includes the following steps.

S610: The terminal device obtains semi-persistent scheduling configuration information.

Optionally, the semi-persistent scheduling configuration information includes at least one of semi-persistent scheduling period information, semi-persistent scheduling window length information (specifically, for example, duration in which at least one window is open), semi-persistent scheduling cell list information, or semi-persistent scheduling HARQ process information. The cell list information indicates a quantity of cells used for semi-persistent scheduling. Optionally, the semi-persistent scheduling configuration information may be sent by using an RRC message.

Optionally, the semi-persistent scheduling configuration information may include a plurality of sets of semi-persistent scheduling configuration information, and each configuration set may be associated with a configuration identifier ID. Optionally, the plurality of sets of semi-persistent scheduling configuration information may differ in period and/or window length.

S620: The terminal device obtains a first indication sent by the network device, where the first indication is used to indicate an uplink resource.

Optionally, the first indication may indicate an uplink transmission resource. Optionally, the uplink transmission resource may include at least one of a quantity of physical resource blocks, a modulation and coding scheme, or a frequency domain resource.

Similarly, the first indication or CRC of the first indication may also be scrambled by using a cell identity of the terminal device.

Optionally, the terminal device may initialize (including starting or restarting) a semi-persistent scheduling configuration based on the first indication.

S630: The terminal device determines at least one window based on the semi-persistent scheduling configuration information and the first indication.

Optionally, the terminal device may determine a semi-persistent scheduling periodic window based on the semi-persistent scheduling configuration information and the first indication. For example, the terminal device may determine a window start location and a periodic window starting from the window start location.

Optionally, a length of the semi-persistent scheduling periodic window may be indicated by using the first indication.

S640: The terminal device generates at least one piece of uplink data.

Herein, for the at least one window of semi-persistent scheduling, the terminal device needs to generate at least one piece of uplink data. This may also be understood as: Each of the at least one window may be corresponding to one piece of uplink data.

Optionally, before a start time unit of each window, a MAC layer of the terminal device needs to prepare one piece of new data, and submit the one piece of new data to a physical layer. Herein, the one piece of new data is understood as one piece of uplink data that needs to be transmitted.

Alternatively, specifically, the terminal device may make a plurality of copies of the generated one piece of new data, and submit the copies to HARQ buffers corresponding to HARQ processes of a plurality of cells, so as to determine, based on a received second indication, a HARQ process or HARQ processes used for sending the new data.

S650: The terminal device receives, within the at least one window, at least one second indication sent by the network device.

Optionally, the terminal device may monitor a downlink physical channel during a period in which the at least one window is open, so as to obtain the second indication.

In other words, during the period in which the at least one window is open, the terminal device may obtain at least one second indication. One second indication may be corresponding to one window. In addition, duration in which each of the at least one window is open may be determined by the semi-persistent scheduling configuration information in S610, or may be determined in another proper manner. This is not limited in this embodiment of this application.

Optionally, the second indication may be sent by the network device by using at least one cell in a cell list. Correspondingly, the terminal device may process the received second indication in chronological order. Alternatively, if the terminal device receives second indications of a plurality of cells in a same time unit, the terminal device may select one of the cells for sending. Optionally, when processing the second indication, the terminal device may select a cell according to a stipulation in a protocol, for example, select a cell with a smallest cell index, to send the uplink data. Alternatively, the terminal device may select a cell for processing, based on a cell identity indicated in the first indication or the second indication or a cell identity carried in an RRC message.

S660: The terminal device determines, based on the first indication and the at least one second indication, a resource location for sending the at least one piece of uplink data, and transmits the at least one piece of uplink data at the resource location.

For example, for one piece of uplink data, the terminal device may determine a time-frequency resource location for the one piece of uplink data based on the first indication and one second indication, and then send the one piece of uplink data at the time-frequency resource location.

Optionally, for the at least one piece of uplink data, the terminal device may perform similar processing.

Herein, a method for determining the "resource location" in the "determining a resource location for sending the at least one piece of uplink data" is similar to the method for determining the "resource location" mentioned above. For brevity, details are not described herein again.

It should be understood that an action of generating the uplink data by the terminal device has no dependency relationship with whether the terminal device receives the second indication. In other words, even if the terminal device does not receive the second indication, the terminal device still generates the uplink data, but there may be no time-frequency resource for sending the uplink data. This is not limited in this embodiment of this application.

Optionally, before the terminal device sends the uplink data at the resource location, the method further includes:

performing, by the terminal device, listen before talk LBT channel detection, and detecting that a channel is a clear channel.

In other words, before sending the uplink data, the terminal device may perform clear channel detection by using a first channel access solution (Channel Access Procedure) or first LBT (for example, 25 μs LBT), and detect that the channel is a clear channel. In this way, the terminal device needs to perform only 25 μs LBT instead of rollback-mechanism-based LBT (implementation of which is relatively time consuming), thereby reducing both a channel contention time and a data transmission delay. Optionally, the first indication may indicate an LBT type, specifically, 25 μs LBT.

Optionally, the method 600 may further include:

when a discontinuous reception DRX mechanism is configured for the terminal device by the network device, if the second indication is received during a period in which the window is open, stopping monitoring the downlink physical channel from a reception moment to a window closing moment.

Herein, during the period in which the window is open, the terminal device may perform an operation of monitoring the downlink physical channel, whereas during a period in which the window is closed, the terminal device cannot perform a monitoring operation.

Specifically, if the terminal device monitors the downlink physical channel and obtains the second indication during the period in which the window is open, the terminal device may not need to monitor the downlink physical channel throughout the entire window. In other words, if the terminal device obtains the second indication, the terminal device may choose not to continue monitoring the downlink physical channel.

Optionally, the method 600 may further include:

starting, by the terminal device, a first timer when the second indication is received; and during running of the first timer, stopping, by the terminal device, monitoring the downlink physical channel.

Similarly, in a scenario in which the terminal device is configured with semi-persistent scheduling, the terminal device may also start the first timer, and during running of the first timer, the terminal device stops monitoring the downlink physical channel, to save power.

Optionally, the method 600 may further include:

when the first timer expires, starting, by the terminal device, a second timer; and during running of the second timer, monitoring, by the terminal device, the downlink physical channel, to obtain a retransmission indication of downlink data.

Optionally, the method 600 may further include:

obtaining, by the terminal device, a third indication, where the third indication is used for changing a current semi-persistent scheduling configuration; and changing, by the terminal device, the at least one of the semi-persistent scheduling period information, the semi-persistent scheduling window length information, the semi-persistent scheduling cell list information, or the semi-persistent scheduling HARQ process information based on the third indication.

Optionally, the third indication may specifically indicate a configuration ID for changing. For example, the terminal device may update, based on the configuration ID, the current semi-persistent scheduling configuration to a semi-persistent scheduling configuration corresponding to the configuration ID.

Optionally, the third indication may be sent by using a PDCCH message, a MAC message, or an RRC message.

Specifically, the terminal device may change the current semi-persistent scheduling configuration based on the third indication. Specifically, the terminal device may update the at least one of the semi-persistent scheduling period information, the semi-persistent scheduling window length information, the semi-persistent scheduling cell list information, or the semi-persistent scheduling HARQ process information. For example, for changing of a window length, the window length is changed from one time unit to three time units. For another example, for changing of a window period, the window period is changed from 10 time units to 20 time units.

Correspondingly, the third indication is sent by the network device based on a change in a load status of an unlicensed channel and/or a change in a real-time service status. In other words, the network device may flexibly adjust a semi-persistent scheduling configuration with reference to a current load status and/or a service status change, to adapt to a data transmission requirement.

Figure 7:
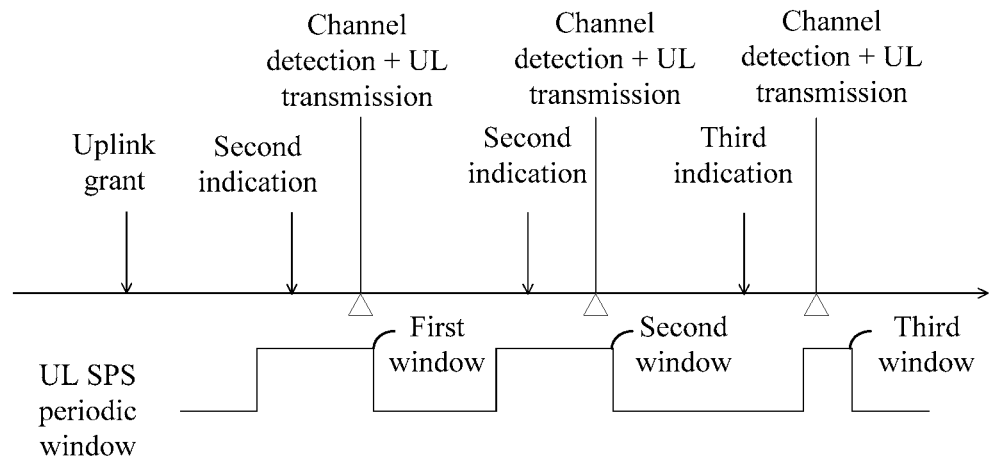
FIG. 7 is a schematic diagram of another example according to an embodiment of this application.

Herein, FIG. 7 is a schematic diagram of another example according to an embodiment of this application. As shown in FIG. 7, a terminal device may obtain an uplink grant, and then perform monitoring in an uplink UL semi-persistent scheduling SPS periodic window, to obtain a second indication, for example, an indication Trigger 1 in a first window and an indication Trigger 2 in a second window. Herein, descriptions are provided only by using an example in which the first window and the second window are a same semi-persistent scheduling configuration. The terminal device may perform 25 μs LBT and uplink data transmission based on the Trigger 1 and the Trigger 2, respectively. Optionally, the terminal device may further receive a third indication, for example, SPS switching information, and then change a semi-persistent scheduling window length, for example, update the current window to a third window (a window length of the third window is less than a window length of the first window or the second window), to perform subsequent data transmission.

In conclusion, for a scenario in which a terminal device is configured with SPS, a data transmission method according to this embodiment of this application is still applicable, and can be used to flexibly determine a resource location for SPS data transmission. Further, the terminal device needs to perform only 25 μs LBT instead of rollback-mechanism-based LBT, thereby reducing a waste of time and a data transmission delay.

Optionally, this embodiment of this application may be further used in a handover scenario. Herein, a difference from the scenario in which a terminal device is configured with SPS is that the first indication may be carried in a "connection reconfiguration message" in the handover scenario. It should be understood that, for brevity, some concepts, terms, or execution actions that are the same as those in the foregoing SPS scenario are not described again. For a network device handover scenario, an embodiment of this application provides a data transmission method. The method may include:

obtaining, by a terminal device, a connection reconfiguration message (which may be specifically an RRC connection reconfiguration message) sent by a source network device, where the connection reconfiguration message includes at least one of semi-persistent scheduling period information, semi-persistent scheduling window length information (specifically, for example, duration in which at least one window is open), semi-persistent scheduling cell list information, semi-persistent scheduling HARQ process information, a quantity of physical resource blocks, a modulation and coding scheme, or a frequency domain resource, and the connection reconfiguration message is forwarded by a target network device to the source network device;

determining, by the terminal device, at least one window based on the connection reconfiguration message;

generating, by the terminal device, uplink data;

receiving, by the terminal device within the at least one window, at least one second indication sent by the network device; and determining, by the terminal device based on the connection reconfiguration message and the second indication, a resource location for sending the uplink data, and transmitting the uplink data at the resource location.

Optionally, before the terminal device transmits the uplink data at the resource location, the method further includes:

performing, by the terminal device, listen before talk LBT channel detection, and detecting that a channel is a clear channel.

In other words, before sending the uplink data, the terminal device may perform clear channel detection by using a first channel access solution or first LBT (for example, 25 µs LBT), and detect that the channel is a clear channel. In this way, the terminal device needs to perform only 25 µs LBT instead of rollback-mechanism-based LBT (implementation of which is relatively time consuming), thereby reducing both a channel contention time and a data transmission delay.

In this embodiment of this application, the terminal device may obtain, in the RRC connection reconfiguration message, a transmission resource (for example, a first indication) required for transmitting the uplink data and a related configuration of semi-persistent scheduling; then determine the at least one window; generate the uplink data; and then, during a period in which the at least one window is open, obtain at least one second indication (a function of the second indication may be similar to that of the second indication in the method 200) sent by the network device. In this way, a resource location for data transmission in SPS can be flexibly determined. The terminal device may determine, based on the connection reconfiguration message and the second indication, the resource location for sending the uplink data, and transmit the uplink data at the resource location.

Optionally, the RRC connection reconfiguration message is generated by the target network device.

Optionally, the RRC connection reconfiguration message may carry a related configuration of DRX, or may carry no related configuration of DRX.

Optionally, the terminal device may receive an acknowledgement indication of an RRC connection reconfiguration complete message, thereby avoiding excessive useless retransmission and reducing occupation of air interface resources.

Figure 8:
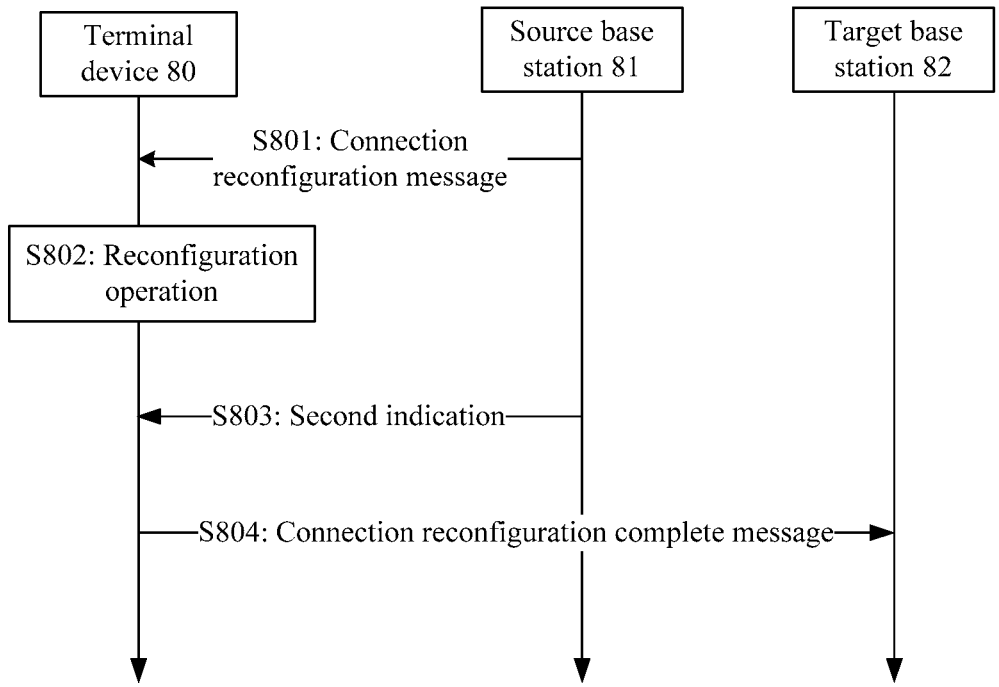
FIG. 8 is a schematic diagram of an example according to another embodiment of this application.

For example, FIG. 8 is a schematic diagram of an example according to another embodiment of this application. It should be understood that only some steps in a handover scenario are described herein as an example, and actual steps should not be limited to steps shown in FIG. 8. As shown in FIG. 8, a source base station 81 and a target base station 82 may be base stations in the handover scenario. Uplink timing advances of the source base station 81 and a corresponding terminal device 80 are the same. Main steps include the following.

S801: The source base station 81 sends a connection reconfiguration message to the terminal device 80.

Optionally, the connection reconfiguration message may include at least one of semi-persistent scheduling period information, semi-persistent scheduling window length information (specifically, for example, duration in which at least one window is open), semi-persistent scheduling cell list information, semi-persistent scheduling HARQ process information, a quantity of physical resource blocks, a modulation and coding scheme, or a frequency domain resource. In other words, herein, a step of sending "a first indication" is omitted. A transmission resource (for example, the quantity of physical resource blocks, the modulation and coding scheme, or the frequency domain resource) indicated by the first indication may be included in the connection reconfiguration message.

S802: The terminal device 80 performs a reconfiguration operation.

Optionally, the terminal device 80 may perform the reconfiguration operation based on the connection reconfiguration message.

S803: The terminal device 80 receives, within at least one window, at least one second indication sent by the source base station 81.

Similarly, the terminal device 80 monitors a downlink physical channel during a period in which the at least one window is open, so as to receive the at least one second indication sent by the source base station 81.

Herein, an execution order of S802 and S803 is not limited.

S804: If the reconfiguration operation is completed, the terminal device 80 sends a connection reconfiguration complete message to the target base station 82.

If the reconfiguration operation is completed, the terminal device 80 may send the connection reconfiguration complete message (this action may be alternatively understood as sending one piece of uplink data, where the one piece of uplink data includes the connection reconfiguration complete message) to the target base station 82 at a resource location determined based on the connection reconfiguration message and the at least one second indication (for a method for determining the resource location, refer to the foregoing embodiment, and details are not described herein again), to notify the target base station 82 that the reconfiguration operation is completed.

Optionally, in this embodiment of this application, "the handover scenario" may alternatively be a handover from one cell to another cell, for example, a handover from a cell 1 to a cell 2 of a same base station, or a handover from a cell 1 of an eNB 1 to a cell 2 of an eNB 2, where the cell 1 and the cell 2 have a same uplink timing advance.

For example, it is assumed that a primary cell of a current terminal device is a serving cell 1.

A handover within a same eNB includes: (1) a handover from the serving cell 1 to a serving cell 2; and (2) a handover from the serving cell 1 to a non-serving cell 2.

A handover between eNBs includes: (1) a handover from the serving cell 1 to a serving cell 2; and (2) a handover from the serving cell 1 to a non-serving cell 2.

In conclusion, a data transmission method according to this embodiment of this application may also be applied to different handover scenarios.

The foregoing has described the data transmission method according to the embodiments of this application. The following describes a terminal device and a network device according to the embodiments of this application.

Figure 9:
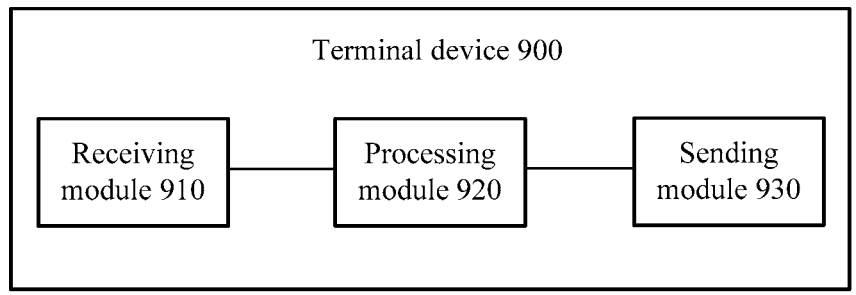
FIG. 9 is a schematic block diagram of a terminal device according to an embodiment of this application.

FIG. 9 is a schematic block diagram of a terminal device 900 according to an embodiment of this application. As shown in FIG. 9, the terminal device 900 includes:

a receiving module 910, configured to receive a first indication sent by a network device;

a processing module 920, configured to: receive downlink data based on the first indication received by the receiving module 910, and generate feedback information of the downlink data, where the receiving module 910 is further configured to receive a second indication sent by the network device, where the second indication is used to indicate a start location of an uplink time unit; and the processing module 920 is further configured to determine, based on the first indication and the second indication that are received by the receiving module 910, a resource location for sending the feedback information; and a sending module 930, configured to send the feedback information at the resource location determined by the processing module 920.

Optionally, in an embodiment, the first indication includes a valid time range, and the receiving module 910 is specifically configured to:

receive, within the valid time range, the second indication sent by the network device.

Optionally, in an embodiment, the terminal device 900 further includes:

a detection module, configured to: perform listen before talk LBT channel detection, and detect that a channel is a clear channel.

Optionally, in an embodiment, the processing module 920 is further configured to:

when a discontinuous reception DRX mechanism is configured for the terminal device 900 by the network device, if the second indication is received within the valid time range, stop monitoring a downlink physical channel from a reception moment to expiration of the valid time range.

Optionally, in an embodiment, the terminal device 900 further includes:

a starting module, configured to start a first timer when the second indication is received, where the processing module 920 is specifically configured to: during running of the first timer, stop monitoring the downlink physical channel.

Optionally, in an embodiment, the starting module is further configured to:

when the first timer expires, start a second timer, where the processing module 920 is specifically configured to: during running of the second timer, monitor the downlink physical channel, to obtain retransmission indication information of the downlink data.

The terminal device 900 according to this embodiment of this application may perform the data transmission method 200 according to the embodiment of this application, and the foregoing and other operations and/or functions of the modules in the terminal device 900 are intended to implement corresponding procedures of the foregoing methods. For brevity, details are not described herein again.

Therefore, the terminal device 900 according to this embodiment of this application receives the first indication sent by the network device; receives the downlink data based on the first indication, and generates the feedback information of the downlink data; then receives the second indication sent by the network device, where the second indication is used to indicate the start location of the uplink time unit; determines, based on the first indication and the second indication, the resource location for sending the feedback information; and finally, sends the feedback information at the resource location. In this way, the resource location for the feedback information can be flexibly determined.

Figure 10:
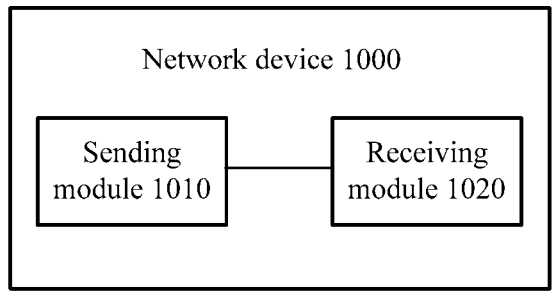
FIG. 10 is a schematic block diagram of a network device according to an embodiment of this application.

FIG. 10 is a schematic block diagram of a network device 1000 according to an embodiment of this application. As shown in FIG. 10, the network device 1000 includes:

a sending module 1010, configured to send a first indication to a terminal device, where the first indication is used by the terminal device to receive downlink data based on the first indication and generate feedback information of the downlink data, where the sending module 1010 is further configured to: after an unlicensed channel is obtained, send a second indication to the terminal device, where the second indication is used to indicate a start location of an uplink time unit; and a receiving module 1020, configured to receive the feedback information sent by the terminal device at a resource location, where the resource location is determined by the terminal device based on the first indication and the second indication.

Optionally, in an embodiment, the sending module 1010 is specifically configured to:

send the second indication to the terminal device within a valid time range.

The network device 1000 according to this embodiment of this application may perform the data transmission method 400 according to the embodiment of this application, and the foregoing and other operations and/or functions of the modules in the network device 1000 are intended to implement corresponding procedures of the foregoing methods. For brevity, details are not described herein again.

Therefore, in this embodiment of this application, the network device 1000 may send the first indication to the terminal device, so that the terminal device receives the downlink data based on the first indication and generates the feedback information of the downlink data. Then, after obtaining the unlicensed channel, the network device 1000 may send the second indication to the terminal device, to notify the terminal device that the terminal device may share a transmission opportunity with the network device 1000 (a transmission opportunity is a usage time after the network device 1000 or the terminal device obtains a channel through channel detection), so that the terminal device needs to use only simple LBT (for example, 25 μs LBT) instead of LBT of a relatively long time (for example, rollback-mechanism-based LBT). The network device 1000 may receive the feedback information sent by the terminal device at the resource location (corresponding to a terminal device side), where the resource location is determined by the terminal device based on the first indication and the second indication. To sum up, the network device 1000 sends the second indication to the terminal device, so that the resource location for the feedback information can be flexibly determined.

Figure 11:
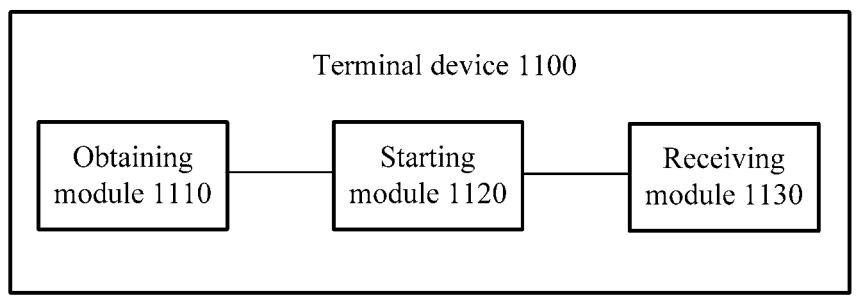
FIG. 11 is a schematic block diagram of a terminal device according to another embodiment of this application.

FIG. 11 is a schematic block diagram of a terminal device 1100 according to another embodiment of this application. As shown in FIG. 11, the terminal device 1100 includes:

an obtaining module 1110, configured to obtain a first uplink grant sent by a network device;

a starting module 1120, configured to: transmit uplink data based on the first uplink grant obtained by the obtaining module 1110, and start a first timer; and a receiving module 1130, configured to: when the first timer expires, receive feedback information that is of the uplink data and that is sent by the network device.

The terminal device 1100 according to this embodiment of this application may perform the data transmission method 500 according to the embodiment of this application, and the foregoing and other operations and/or functions of the modules in the terminal device 1100 are intended to implement corresponding procedures of the foregoing methods. For brevity, details are not described herein again.

Therefore, the terminal device 1100 may receive the feedback information that is of the uplink data and that is sent by the network device, so as to learn a decoding status of the network device.

Figure 12:
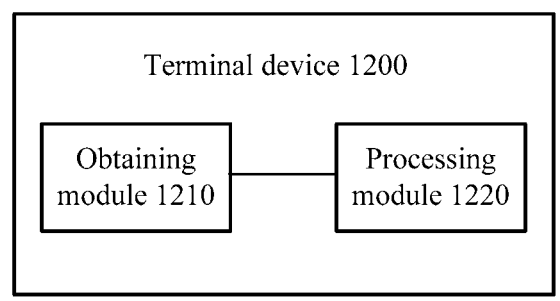
FIG. 12 is a schematic block diagram of a terminal device according to still another embodiment of this application.

FIG. 12 is a schematic block diagram of a terminal device 1200 according to still another embodiment of this application. As shown in FIG. 12, the terminal device 1200 includes:

an obtaining module 1210, configured to obtain semi-persistent scheduling configuration information, where the obtaining module 1210 is further configured to obtain a first indication sent by a network device, where the first indication is used to indicate an uplink resource; and a processing module 1220, configured to determine at least one window based on the semi-persistent scheduling configuration information and the first indication that are obtained by the obtaining module 1210.

The processing module 1220 is further configured to generate at least one piece of uplink data.

The obtaining module 1210 is further configured to receive, within the at least one window, at least one second indication sent by the network device.

The processing module 1220 is further configured to: determine, based on the first indication and the at least one second indication, a resource location for sending the at least one piece of uplink data, and transmit the at least one piece of uplink data at the resource location.

The terminal device 1200 according to this embodiment of this application may perform the data transmission method 600 according to the embodiment of this application, and the foregoing and other operations and/or functions of the modules in the terminal device 1200 are intended to implement corresponding procedures of the foregoing methods. For brevity, details are not described herein again.

Therefore, the terminal device 1200 can flexibly determine a resource location for SPS data transmission by obtaining the second indication. Further, the terminal device 1200 needs to perform only 25 μs LBT instead of rollback-mechanism-based LBT, thereby reducing a waste of time and a data transmission delay.

Figure 13:
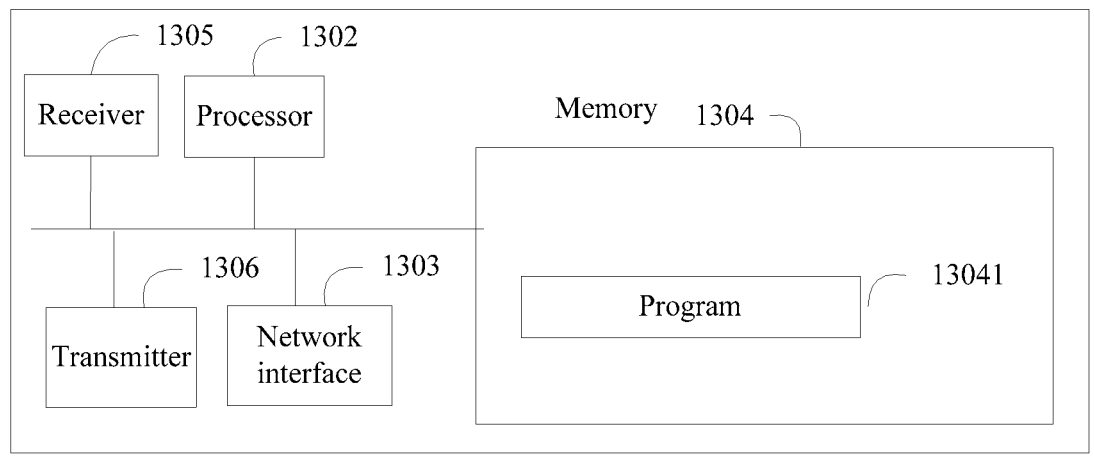
FIG. 13 is a structural block diagram of a terminal device according to an embodiment of this application.

FIG. 13 shows a structure of a terminal device according to an embodiment of this application, and the structure includes at least one processor 1302 (for example, a CPU), at least one network interface 1303 or another communications interface, and a memory 1304. Optionally, a receiver 1305 and a transmitter 1306 may be further included. The processor 1302 is configured to execute an executable module, for example, a computer program, stored in the memory 1304. The memory 1304 may include a high-speed random access memory (Random Access Memory, RAM), or may further include a nonvolatile memory (non-volatile memory), for example, at least one magnetic disk storage. A communications connection to at least one other network element is implemented by using the at least one network interface 1303 (the connection may be implemented in a wired or wireless manner). The receiver 1305 and the transmitter 1306 are configured to transmit various signals or information.

In some implementations, the memory 1304 stores a program 13041. The program 13041 may be executed by the processor 1302, and is used to perform the terminal-device-side method according to the foregoing embodiments of this application.

Figure 14:
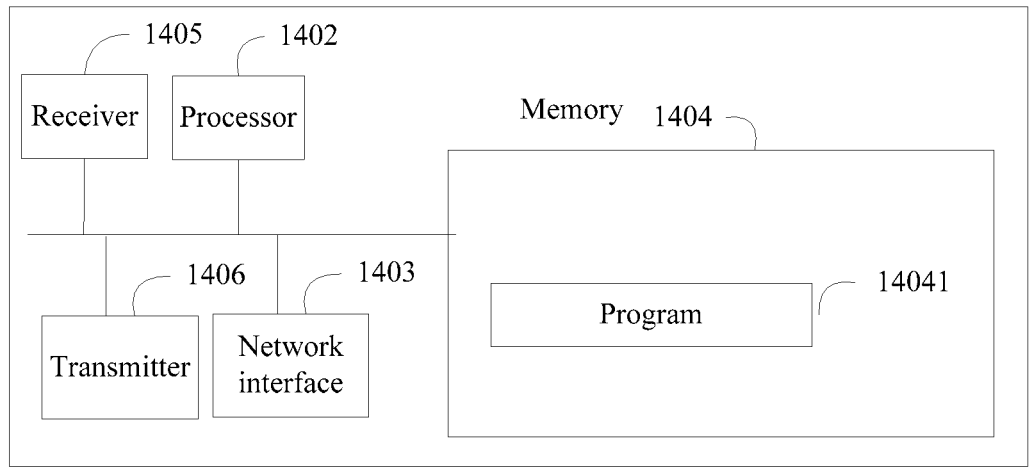
FIG. 14 is a structural block diagram of a network device according to an embodiment of this application.

FIG. 14 shows a structure of a network device according to an embodiment of this application, and the structure includes at least one processor 1402 (for example, a CPU), at least one network interface 1403 or another communications interface, and a memory 1404. Optionally, a receiver 1405 and a transmitter 1406 may be further included. The processor 1402 is configured to execute an executable module, for example, a computer program, stored in the memory 1404. The memory 1404 may include a high-speed random access memory RAM, or may further include a nonvolatile memory (non-volatile memory), for example, at least one magnetic disk storage. A communications connection to at least one other network element is implemented by using the at least one network interface 1403 (the connection may be implemented in a wired or wireless manner). The receiver 1405 and the transmitter 1406 are configured to transmit various signals or information.

In some implementations, the memory 1404 stores a program 14041. The program 14041 may be executed by the processor 1402, and is used to perform the network-device-side method according to the foregoing embodiments of this application.

Figure 15:
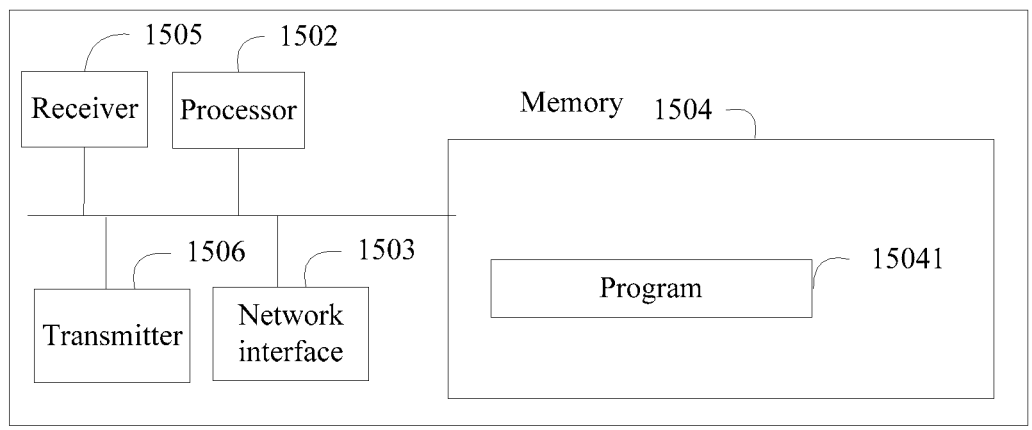
FIG. 15 is a structural block diagram of a terminal device according to an embodiment of this application.

FIG. 15 shows a structure of a terminal device according to an embodiment of this application, and the structure includes at least one processor 1502 (for example, a CPU), at least one network interface 1503 or another communications interface, and a memory 1504. Optionally, a receiver 1505 and a transmitter 1506 may be further included. The processor 1502 is configured to execute an executable module, for example, a computer program, stored in the memory 1504. The memory 1504 may include a high-speed random access memory RAM, or may further include a nonvolatile memory (non-volatile memory), for example, at least one magnetic disk storage. A communications connection to at least one other network element is implemented by using the at least one network interface 1503 (the connection may be implemented in a wired or wireless manner). The receiver 1505 and the transmitter 1506 are configured to transmit various signals or information.

In some implementations, the memory 1504 stores a program 15041. The program 15041 may be executed by the processor 1502, and is used to perform the terminal-device-side method according to the foregoing embodiments of this application.

Figure 16:
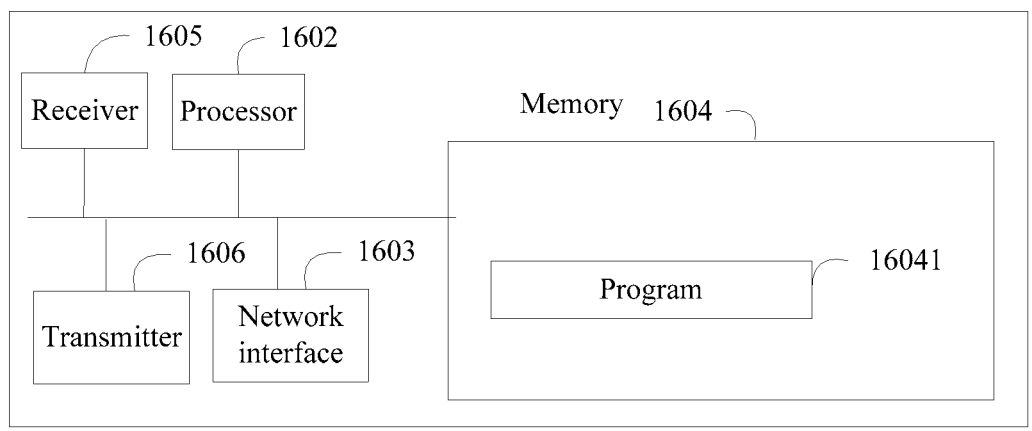
FIG. 16 is a structural block diagram of a terminal device according to an embodiment of this application.

FIG. 16 shows a structure of a terminal device according to an embodiment of this application, and the structure includes at least one processor 1602 (for example, a CPU), at least one network interface 1603 or another communications interface, and a memory 1604. Optionally, a receiver 1605 and a transmitter 1606 may be further included. The processor 1602 is configured to execute an executable module, for example, a computer program, stored in the memory 1604. The memory 1604 may include a high-speed random access memory RAM, or may further include a nonvolatile memory (non-volatile memory), for example, at least one magnetic disk storage. A communications connection to at least one other network element is implemented by using the at least one network interface 1603 (the connection may be implemented in a wired or wireless manner). The receiver 1605 and the transmitter 1606 are configured to transmit various signals or information.

In some implementations, the memory 1604 stores a program 16041. The program 16041 may be executed by the processor 1602, and is used to perform the terminal-device-side method according to the foregoing embodiments of this application.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the embodiments of this application.

It may be clearly understood by a person skilled in the art that, for ease and brevity of description, for detailed working processes of the foregoing described system, apparatus, and unit, reference may be made to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or may be integrated into another system, or some features may be ignored or not be performed. In addition, the displayed or discussed mutual couplings or direct couplings or communications connections may be implemented by using some interfaces. The indirect couplings or communications connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual requirements, to achieve the objectives of the solutions of the embodiments.

In addition, functional units in the embodiments of the present invention may be integrated into one processing unit, or each of the units may exist alone physically, or two or more units may be integrated into one unit.

When the functions are implemented in a form of a software functional unit and sold or used as an independent product, the functions may be stored in a computer readable storage medium. Based on such an understanding, the technical solutions in the embodiments of this application essentially, or the part contributing to the prior art, or some of the technical solutions may be implemented in a form of a software product. The software product is stored in a storage medium, and includes instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the embodiments of this application, but are not intended to limit the protection scope of the embodiments of this application. Any variation or replacement readily figured out by a person skilled in the art within the technical scope disclosed in the embodiments of this application shall fall within the protection scope of the embodiments of this application. Therefore, the protection scope of the embodiments of this application shall be subject to the protection scope of the claims.

What is claimed is:

1. A data transmission method, comprising:
   receiving, by a terminal device, a first indication sent by a network device;
   receiving, by the terminal device, downlink data based on the first indication;
   generating, by the terminal device, feedback information of the downlink data;
   receiving, by the terminal device, a second indication sent by the network device, wherein the second indication indicates a start location of an uplink time unit;
   starting, by the terminal device, a first timer when the second indication is received;
   during running of the first timer, refraining, by the terminal device, from monitoring a downlink physical channel;
   determining, by the terminal device based on the first indication and the second indication, a resource location for sending the feedback information; and
   sending, by the terminal device, the feedback information at the resource location.

2. The method according to claim 1, wherein the first indication comprises a valid time range, and the receiving, by the terminal device, a second indication sent by the network device comprises:
   receiving, by the terminal device within the valid time range, the second indication sent by the network device.

3. The method according to claim 2, wherein the method further comprises:
   when a discontinuous reception (DRX) mechanism is configured for the terminal device by the network device, if the second indication is received within the valid time range, refraining from monitoring the downlink physical channel from a reception moment to expiration of the valid time range.

4. The method according to claim 1, wherein before the sending, by the terminal device, the feedback information at the resource location, the method further comprises:
   performing, by the terminal device, listen before talk (LBT) channel detection, and detecting that a channel is a clear channel.

5. The method according to claim 1, wherein the method further comprises:
   when the first timer expires, starting, by the terminal device, a second timer; and during running of the second timer, monitoring, by the terminal device, the downlink physical channel, to obtain retransmission indication information of the downlink data.

6. A data transmission method, comprising:
sending, by a network device, a first indication to a terminal device, wherein the first indication is used by the terminal device to receive downlink data based on the first indication and generate feedback information of the downlink data;
after obtaining an unlicensed channel, sending, by the network device, a second indication to the terminal device, wherein the second indication indicates a start location of an uplink time unit, wherein the second indication triggers the terminal device to start a first timer, and during running of the first timer, the terminal device refrains from monitoring a downlink physical channel; and
receiving, by the network device, the feedback information sent by the terminal device at a resource location, wherein the resource location is determined by the terminal device based on the first indication and the second indication.

7. The method according to claim 6, wherein the first indication comprises a valid time range, and the sending a second indication to the terminal device comprises:
sending the second indication to the terminal device within the valid time range.

8. A data transmission device, comprising at least one processor and one or more memories coupled to the at least one processor and storing programming instructions for execution by the at least one processor that cause the data transmission device to:
receive first indication sent by a network device;
receive downlink data based on the first indication;
generate feedback information of the downlink data;
receive a second indication sent by the network device, wherein the second indication indicates a start location of an uplink time unit;
start a first timer when the second indication is received;
during running of the first timer, refrain from monitoring a downlink physical channel;
determine, based on the first indication and the second indication, a resource location for sending the feedback information; and
sending the feedback information at the resource location.

9. The device according to claim 8, wherein the first indication comprises a valid time range, and the programming instructions instruct the at least one processor to:
receive, within the valid time range, the second indication sent by the network device.

10. The device according to claim 9, wherein the programming instructions cause the data transmission device to:
when a discontinuous reception (DRX) mechanism is configured for the device by the network device, if the second indication is received within the valid time range, refrain from monitoring the downlink physical channel from a reception moment to expiration of the valid time range.

11. The device according to claim 8, wherein the programming instructions instruct the at least one processor to, before sending the feedback information at the resource location, perform, listen before talk (LBT) channel detection, and detecting that a channel is a clear channel.

12. The device according to claim 8, wherein the programming instructions cause the data transmission device to:
when the first timer expires, start a second timer; and during running of the second timer, monitor, the downlink physical channel, to obtain retransmission indication information of the downlink data.

13. A data transmission device, comprising at least one processor and one or more memories coupled to the at least one processor and storing programming instructions for execution by the at least one processor that cause the data transmission device to:
send a first indication to a terminal device, wherein the first indication is used by the terminal device to receive downlink data based on the first indication and generate feedback information of the downlink data;
after obtaining an unlicensed channel, send a second indication to the terminal device, wherein the second indication indicates a start location of an uplink time unit, wherein the second indication triggers the terminal device to start a first timer, and during running of the first timer, the terminal device refrains from monitoring a downlink physical channel; and
receive, the feedback information sent by the terminal device at a resource location, wherein the resource location is determined by the terminal device based on the first indication and the second indication.

14. The device according to claim 13, wherein the first indication comprises a valid time range, and the programming instructions cause the data transmission device to:
send the second indication to the terminal device within the valid time range.

15. A non-transitory computer-readable storage medium, comprising a program, wherein when being executed by at least one processor, the program instructs the at least one processor to perform operations comprising:
receiving first indication sent by a network device;
receiving downlink data based on the first indication;
generating feedback information of the downlink data;
receiving a second indication sent by the network device, wherein the second indication indicates a start location of an uplink time unit;
starting a first timer when the second indication is received;
during running of the first timer, refraining from monitoring a downlink physical channel;
determining, based on the first indication and the second indication, a resource location for sending the feedback information; and
sending the feedback information at the resource location.

16. The non-transitory computer-readable storage medium to claim 15, wherein the first indication comprises a valid time range, and the the receiving a second indication sent by the network device comprises:
receiving, within the valid time range, the second indication sent by the network device.

17. The non-transitory computer-readable storage medium according to claim 16, wherein the operations further comprise:
when a discontinuous reception (DRX) mechanism is configured by the network device, if the second indication is received within the valid time range, refraining from monitoring the downlink physical channel from a reception moment to expiration of the valid time range.

18. The non-transitory computer-readable storage medium according to claim 15, wherein the operations further comprise: before the sending, the feedback information at the resource location, performing, listen before talk (LBT) channel detection, and detecting that a channel is a clear channel.

19. The non-transitory computer-readable storage medium according to claim 15, wherein the operations further comprise:
   when the first timer expires, starting a second timer; and
   during running of the second timer, monitoring, the downlink physical channel, to obtain retransmission indication information of the downlink data.

20. A non-transitory computer-readable storage medium, comprising a program, wherein when being executed by at least one processor, the program instructs the at least one processor to perform operations comprising:
   sending a first indication to a terminal device, wherein the first indication is used by the terminal device to receive downlink data based on the first indication and generate feedback information of the downlink data;
   after obtaining an unlicensed channel, sending a second indication to the terminal device, wherein the second indication indicates a start location of an uplink time unit, wherein the second indication triggers the terminal device to start a first timer, and during running of the first timer, the terminal device refrains from monitoring a downlink physical channel; and
   receiving the feedback information sent by the terminal device at a resource location, wherein the resource location is determined by the terminal device based on the first indication and the second indication.

21. The non-transitory computer-readable storage medium according to claim 20, wherein the first indication comprises a valid time range, and the operations further comprise:
   sending the second indication to the terminal device within the valid time range.

\* \* \* \* \*